US010241668B2

(12) United States Patent
Sharifi et al.

(10) Patent No.: US 10,241,668 B2
(45) Date of Patent: *Mar. 26, 2019

(54) DRAG-AND-DROP ON A MOBILE DEVICE

(71) Applicant: GOOGLE INC., Mountain View, CA (US)

(72) Inventors: Matthew Sharifi, Kilchberg (CH); David Petrou, Brooklyn, NY (US)

(73) Assignee: GOOGLE LLC, Mountain View, CA (US)

( * ) Notice: Subject to any disclaimer, the term of this patent is extended or adjusted under 35 U.S.C. 154(b) by 209 days.

This patent is subject to a terminal disclaimer.

(21) Appl. No.: 15/432,493

(22) Filed: Feb. 14, 2017

(65) Prior Publication Data

US 2017/0153782 A1    Jun. 1, 2017

Related U.S. Application Data

(63) Continuation of application No. 14/522,927, filed on Oct. 24, 2014, now Pat. No. 9,606,716.

(51) Int. Cl.
| | |
|---|---|
| *G06F 3/0486* | (2013.01) |
| *G06F 3/16* | (2006.01) |
| *G06F 9/54* | (2006.01) |
| *G06F 3/0484* | (2013.01) |
| *G06F 3/0488* | (2013.01) |

(52) U.S. Cl.
CPC .......... *G06F 3/0486* (2013.01); *G06F 3/0488* (2013.01); *G06F 3/04842* (2013.01); *G06F 3/04883* (2013.01); *G06F 3/167* (2013.01); *G06F 9/543* (2013.01); *G06F 2203/04803* (2013.01)

(58) Field of Classification Search
CPC ..................................................... G06F 3/0486
USPC .......................................................... 715/770
See application file for complete search history.

(56) References Cited

U.S. PATENT DOCUMENTS

| | | |
|---|---|---|
| 7,370,281 B2 | 5/2008 | Weber |
| 8,150,911 B2 | 4/2012 | Bell et al. |
| 8,413,040 B2 | 4/2013 | O'Dell-Alexander |
| (Continued) | | |

FOREIGN PATENT DOCUMENTS

EP    2306290 A2    4/2011

OTHER PUBLICATIONS

International Search Report and Written Opinion from PCT/US2015/056434, dated Dec. 23, 2015, 15 pages.

*Primary Examiner* — William D Titcomb
(74) *Attorney, Agent, or Firm* — Middleton Reutlinger

(57) ABSTRACT

Implementations provide an improved drag-and-drop operation on a mobile device. For example, a method includes identifying a drag area in a user interface of a first mobile application in response to a drag command and receiving a drop location in a second mobile application that differs from the first mobile application. The method may also include determining that a drop location is a text input control and the drag area is not text-based, performing a search for a text description of the drag area, and pasting the text description into the text input control. The method may also include determining that a drop location is an image input control and that the drag area is text based, performing a search using the drag area for a responsive image, and pasting the responsive image into the image input control.

20 Claims, 12 Drawing Sheets

(56) References Cited

U.S. PATENT DOCUMENTS

| | | |
|---|---|---|
| 8,520,000 B2 | 8/2013 | Duncker et al. |
| 8,683,362 B2 | 3/2014 | Shiplacoff et al. |
| 8,732,619 B2 | 5/2014 | Knitowski et al. |
| 8,751,965 B2 | 6/2014 | Wiley et al. |
| 8,793,605 B2 | 7/2014 | Szeto |
| 8,954,857 B2 | 2/2015 | Penner et al. |
| 9,165,284 B2 | 10/2015 | Szeto |
| 9,229,235 B2 | 1/2016 | Ballard et al. |
| 9,424,167 B2 | 8/2016 | Lee et al. |
| 9,606,716 B2 * | 3/2017 | Sharifi ................ G06F 3/04842 |
| 2003/0156142 A1 | 8/2003 | Nonaka et al. |
| 2007/0300170 A1 | 12/2007 | Bier et al. |
| 2010/0262928 A1 | 10/2010 | Abbott |
| 2011/0067025 A1 | 3/2011 | Cragun et al. |
| 2013/0091463 A1 | 4/2013 | Nordstrom et al. |
| 2013/0305132 A1 | 11/2013 | Distefano |
| 2014/0160054 A1 | 6/2014 | Rabii et al. |
| 2014/0280089 A1 | 9/2014 | Moxley et al. |
| 2014/0282660 A1 | 9/2014 | Oztaskent et al. |
| 2015/0269231 A1 | 9/2015 | Huynh et al. |
| 2016/0117072 A1 * | 4/2016 | Sharifi ................ G06F 3/04842 715/769 |

\* cited by examiner

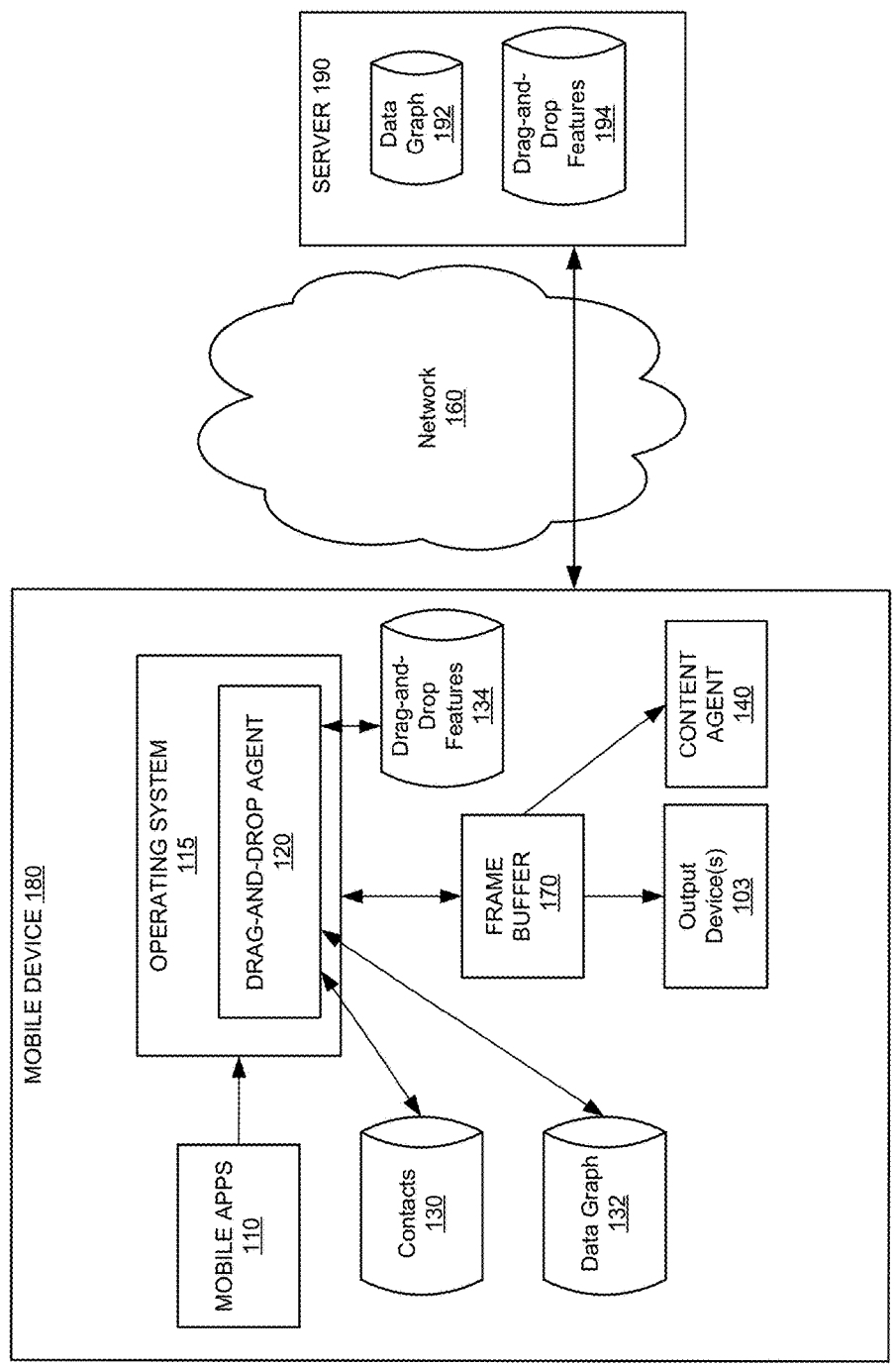

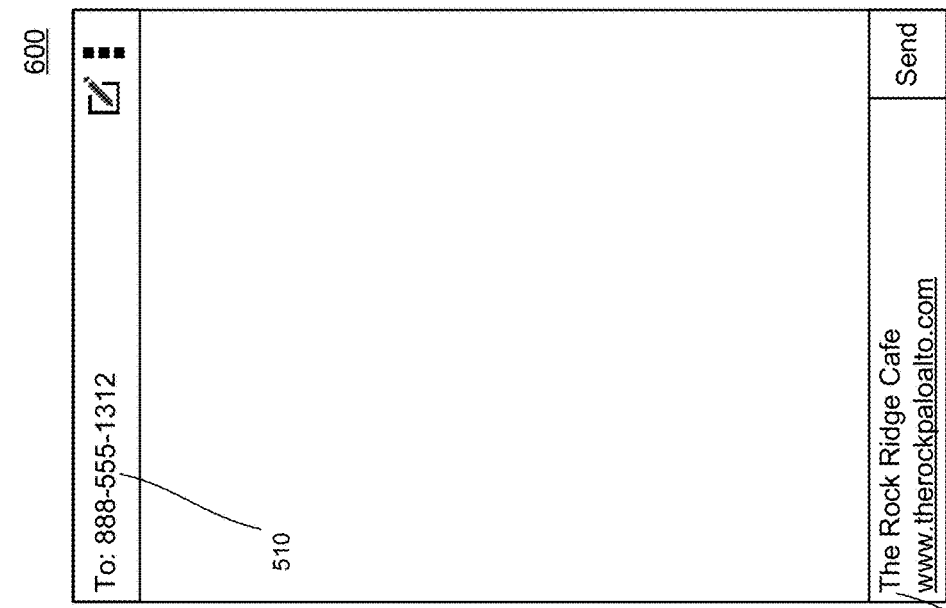
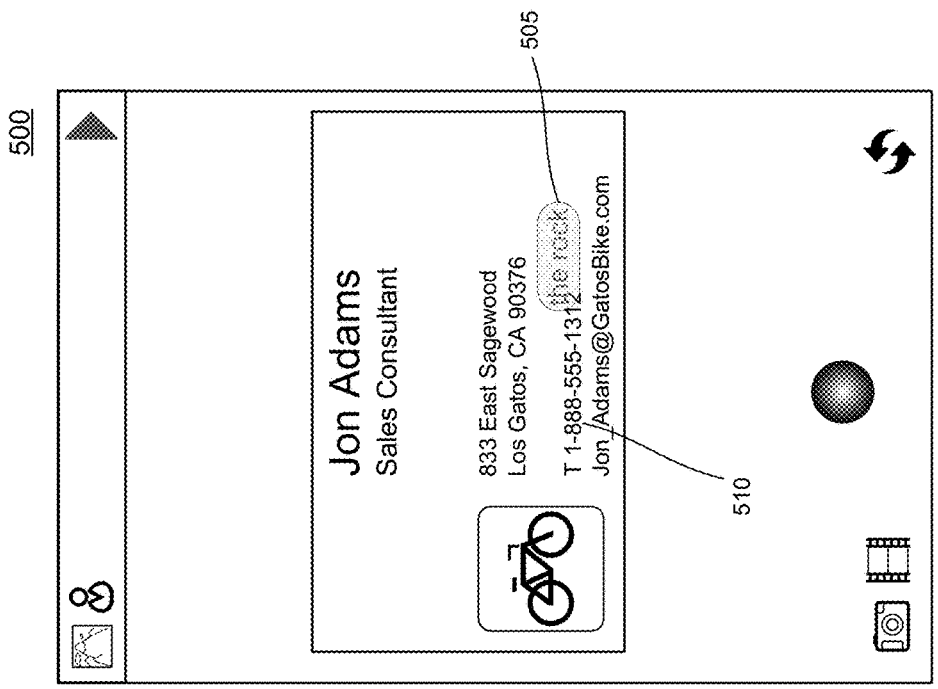
FIG. 6
FIG. 5

DRAG-AND-DROP ON A MOBILE DEVICE

RELATED APPLICATION

This application is a continuation of, and claims priority to, U.S. application Ser. No. 14/522,927, titled "Improved Drag-and-Drop on a Mobile Device," filed Oct. 24, 2014, the disclosure of which is incorporated herein in its entirety.

BACKGROUND

Use of mobile devices, such as smartphones and tablets, has been increasing. But sharing information between applications in a mobile environment can be cumbersome, as mobile applications generally perform specific functions and conventionally do not interact. Consequently, mobile users may resort to memorizing information or navigating back and forth between mobile applications to accomplish a task.

SUMMARY

Implementations provide improved drag-and-drop and smart copy operations for a mobile environment. The improved drag-and-drop operation may use an entity-based model to determine what to drop and what action the system takes as a result of the drop. The improved drag-and-drop operation may also use a search-based model when an expected input to a drop location does not correspond to the type of information selected by the corresponding drag command. The improved drag-and-drop occurs on a device level, so that a user can use the improved drag-and-drop operation in any mobile application. Implementations enable a user to select any on-screen entity as the object of the drag. The entity may be text-based or may be image-based without text elements. The entity may exist in a public graph-based data store, a device data store, or a user-specific data store. The drop command may trigger different actions based on the drop location. The system may also include a machine-learning process that tracks the actions that drop locations for entities or entity types selected by a drag command, and may suggest drop sites or drop locations to the user, thus reducing the input needed from a user to complete the drag-and-drop operation.

According to certain aspects of the disclosure, a method includes identifying, on a touchscreen display, a drag area in a user interface of a first mobile application in response to a drag command from a user of a mobile device and identifying an entity from a graph-based data store based on recognition performed on content in the drag area. The method may also include receiving a drop location associated with a second mobile application, the second mobile application differing from the first mobile application, determining an action to be performed in the second mobile application based on the drop location, and performing the action in the second mobile application using the entity.

According to certain aspects of the disclosure, a mobile device includes a display, at least one processor, and memory storing instructions that, when executed by the at least one processor, cause the mobile device to perform operations. The operations may include identifying a drag area in a user interface of a first mobile application in response to a drag command from a user of the mobile device, determining, based on recognition performed on content in the drag area, that the drag area includes at least one entity from a graph-based data store storing a graph having entities as nodes of the graph, receiving a drop location, determining the drop location is associated with a contact entity, and automatically initiating a communication to the contact entity, the communication including information about the entity from the graph.

According to certain aspects of the disclosure, a method includes receiving a selection of a smart copy control for a text input control on a mobile device, the text input control being in a first mobile application, receiving a selected area of a display generated by a second mobile application, and identifying at least one entity of a graph-based data store in the selected area based on recognition performed on content of the selected area. The method may also include automatically navigating back to the text input control in the first mobile application and pasting a text description of the entity from the graph in the text input control.

According to another aspect of the disclosure, a method includes identifying, on a touchscreen display of a mobile computing device, a drag area in a user interface of a first mobile application in response to a drag command from a user of a mobile device, wherein the drag area is not text-based, receiving a drop location associated with a second mobile application, the second mobile application differing from the first mobile application, determining that the drop location is a text input control, performing an image search to determine a text description for the drag area and pasting the text description into the text input control.

In one general aspect, a computer program product embodied on a computer-readable storage device includes instructions that, when executed by at least one processor formed in a substrate, cause a computing device to perform any of the disclosed methods, operations, or processes. Another general aspect includes a system and/or a method for providing an entity-based or search-based drag-and-drop operation that minimizes the input actions taken by a user to move information from one mobile application to another and to perform related tasks.

One or more of the implementations of the subject matter described herein can be implemented so as to realize one or more of the following advantages. As one example, a user can select text or images as the object of a drag-and-drop operation. The text can be included in an image, for example from a camera preview application, and need not be rendered as text by the mobile application. This provides more options for a user when selecting the information to be moved from one application to another. Indeed, any entity in the camera's field of view can be the object of a drag-and-drop operation. Furthermore, entities other than a text input control may function as the drop location. As another example, the action performed in response to the drop command may be determined based on a combination of the entity identified in the drag area and the drop location. As another example, while the drag area may be image-based, the result of a drop command may be text inserted into a text input control. As another example, the text pasted by a drop command may be more descriptive or include more information than the text identified in a drag area; this can produce more accurate results with less user interaction. For example, when a user copies the text "jaguar"—the paste may include "Jacksonville Jaguars" to represent the football team, or "Jaguar Lounge" to represent a restaurant, depending on the context for the drag area and the context of the drop location.

In some implementations, the improved drag-and-drop may use a search to enable a user to change the type of object dropped. For example, a user may select text that does not correspond to an entity in a graph-based data store in a local database, or a user-based data store, but may select an image input control as the drop location. The system may use this as a cue to search for images responsive to the selected text and enable the user to select one of the images to drop in the image input control. The system may correspondingly enable selection of an image that does not correspond with a known entity in the graph-based data store and use a search to find a text equivalent for the image to paste into a text input control that the user selected as the drop location.

As another example, implementations can provide suggestions for drop locations or drop sites when a user selects an entity via a drag command. The system may offer high-quality suggestions, based on past user-interactions or on past interactions by other users for the same entity type. This minimizes the input provided by a user to accomplish the same task, easing the navigation burden on the user.

The details of one or more implementations are set forth in the accompanying drawings and the description below. Other features will be apparent from the description and drawings, and from the claims.

BRIEF DESCRIPTION OF DRAWINGS

FIG. 1 is a block diagram illustrating an example system in accordance with the disclosed subject matter.

FIG. 5 illustrates an example content entity drop location for an improved drag-and-drop operation, in accordance with disclosed implementations.

FIG. 6 illustrates an example action performed as a result of the drop command of FIG. 5, in accordance with disclosed implementations.

Like reference symbols in the various drawings indicate like elements.

DETAILED DESCRIPTION

FIG. 1 is a block diagram of an improved drag-and-drop system 100 in accordance with an example implementation. The system 100 may perform an entity-based or search-based drag-and-drop operation and/or an entity-based smart copy operation. An entity represents any noun and may be text-based or image-based. For example, the Statue of Liberty is a noun and can be recognized by people from text, such as Lady Liberty, Green Goddess, or Statue of Liberty, or from an image or silhouette of the Statue of Liberty. Accordingly, entities may be a person, place, item, idea, topic, word, phrase, abstract concept, concrete element, other suitable thing, or any combination of these, and may be identified in text or images. Entities may be stored in data stores. Some entities may be stored as nodes in a graph-based data store. The graph-based data store may organize information about an entity using links between nodes. For example, entities may be related to each other in the graph-based data store by labeled edges that represent relationships. Some entities may be stored in other types of data stores and may be recognizable because they fit a pattern or regular expression. For example, phone numbers and email addresses can be recognized as such because they fit a pattern. Entities may also have types. For example, both an email entity and a phone number entity may be contact entities. The graph-based data store may include relationships or metadata that indicates which entity types a particular entity belongs to.

The system 100 in FIG. 1 is a client-server system, with some data processing occurring at a server 190. However, other configurations and applications may be used. For example, the data processing may occur exclusively on the mobile device 180. In some implementations, a user of the mobile device 180 may indicate that portions of the processing be performed at the server 190. While one client is illustrated in FIG. 1, it is also understood that multiple clients may use server 190. Implementations are not limited to the exact configurations illustrated.

Figure 12:
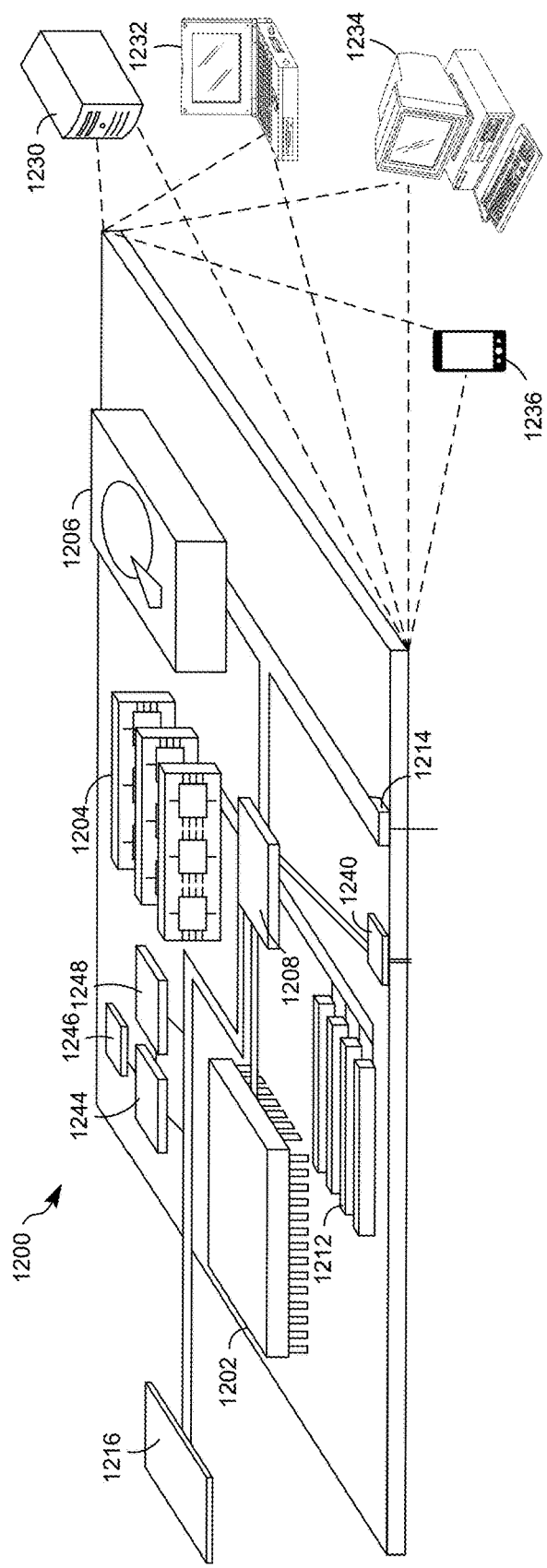
FIG. 12 shows an example of a computer device that can be used to implement the described techniques.

The improved drag-and-drop system 100 may include mobile device 180. Mobile device 180 may be any mobile personal computing device, such as a smartphone or other handheld computing device, a tablet, a wearable computing device, etc., that operates in a closed mobile environment rather than a conventional open web-based environment. Mobile device 180 may be an example of computer device 1200, as depicted in FIG. 12. Although FIG. 1 illustrates a mobile device 180, it is understood that some implementations may use a personal computer or laptop. Mobile device 180 may include one or more processors formed in a substrate configured to execute one or more machine executable instructions or pieces of software, firmware, or a combination thereof. The mobile device 180 may include an operating system 115 and one or more computer memories configured to store one or more pieces of data, either temporarily, permanently, semi-permanently, or a combination thereof. The mobile device 180 may thus include applications, including mobile applications 110, drag-and-drop agent 120, and operating system 115, which represent machine executable instructions in the form of software, firmware, or a combination thereof.

Conventionally, mobile applications, such as mobile applications 110, operate in a closed environment, meaning that the user employs separate applications to perform activities conventionally performed in a web-based browser environment. For example, rather than going to reservation.com to book a hotel or airline ticket, a user of the mobile device 180 can use a mobile application provided by reservation.com. Of course, the mobile application provided by reservation.com only provides for making reservations. If the user of mobile device 180 wants to look up an address, the user must switch to a map mobile application. While conventional mobile devices allow some rendered text to be copied to another location, such conventional operations are limited to text rendered as text. Text not rendered as text, e.g., text in a picture preview interface, cannot be copied using conventional copy-paste techniques. Thus, not all content displayed on a mobile device has the ability to be copied from one mobile application to another using conventional techniques.

To provide an improved information sharing interface, the mobile device 180 may include drag-and-drop agent 120. The drag-and-drop agent 120 may be part of the operating system 115 or may be a standalone program. In situations where an improved drag-and-drop operation complies with terms of service, the drag-and-drop agent 120 may be activated when a user performs a drag command, such as a long press, a smudge, a two-finger tap, or some other gesture combination. The drag-and-drop agent 120 may provide the opportunity for the user to select an area of the screen in response to the drag command. For example, the system may present a resizable shape, such as a rectangle, oval, circle, ellipse, etc., and the user may expand or contract the shape until the desired area on the display is selected. This selected area of the display, which may be selected by the performance of a drag command, such as a long press, a smudge, a two-finger tap, or some other gesture combination, can also be referred to as the drag area. In some implementations, the drag-and-drop agent 120 may perform recognition on the selected area to find any entities represented in the drag area. For example, the drag-and-drop agent 120 may use character recognition, image recognition, logo recognition, facial recognition, etc. to identify entities in the pixels of the drag area using conventional entity identification techniques. In some implementations, the drag-and-drop agent 120 may send the selected area to a server, such as server 190, which performs the recognition and entity identification. The server may provide the drag-and-drop agent 120 with the identified entities. If the drag-and-drop agent 120 identifies two or more possible entities that correspond to the same text (or image) in the drag area, the drag-and-drop agent 120 may use content outside the drag area for context to disambiguate the entities, e.g., selecting one of the two entities. In some implementations, the drag-and-drop agent 120 may wait disambiguate between the two entities based on the drop location.

In some implementations, onscreen entities may have been recognized prior to the drag command. For example, the drag-and-drop agent 120 or a content agent 140 may perform recognition on the entire screen, mapping the contents to entities, prior to receipt of a drag command. In such an implementation, after a user performs a drag command the drag-and-drop agent 120 may focus on or select an entity in or closest to the selected area of the screen. In such an implementation, the drag-and-drop agent 120 may determine the selected area of the screen based on a location of the drag command and a previously recognized entity closest to the location. Of course, in some implementations the drag-and-drop page 120 or the content agent 140 may use server 190 during entity recognition, as described above.

Once an entity is identified in the drag area, the drag-and-drop agent 120 may use drag-and-drop features 134 to suggest a drop site or drop location to the user. The drag-and-drop features 134 may represent information about past drag-and-drop operations and may be used by a machine learning algorithm to predict drop locations likely to be relevant based on the past drag-and-drop operations. In some implementations, the drag-and-drop features 134 may represent past actions of the user of the mobile device 180. In some implementations, the drag-and-drop features 134 may be supplemented by information from server 190, for example from drag-and-drop features 194. In some implementations, the server 190 may periodically provide the mobile device 180 with coefficients to update drag-and-drop features 134 and the drag-and-drop agent 120 may use the coefficients to predict the likelihood of a drop location given the entity identified in the drag area, enabling the mobile device 180 to make a prediction without communicating with the server 190 for each prediction. The mobile device 180 may periodically update the server 190 with historical data from drag-and-drop features 134, which the server 190 may use to calculate updated coefficients. The server 190 may provide the updated coefficients to the mobile device 180. In some implementations, the mobile device 180 may operate its own machine learning algorithm to determine prediction coefficients, obviating the need for communication with any other computer.

The suggested drop locations may be based on the entity type of the entity identified in the drop area. For example, the drag-and-drop features 134 may indicate that a restaurant entity is often dropped into a reservation mobile application or a map application and offer these mobile applications as suggested drop locations. Thus, the drag-and-drop agent 120 may provide a user interface that allows the user of the mobile device 180 to select or reject suggested drop locations. If there are no suggestions, or if the user fails to select a suggestion, the drag-and-drop agent 120 may provide an indication that the mobile device awaits a drop command as an overlay displayed as the user navigates on the mobile device. In some implementations, the indication may be a floating, transparent or semi-transparent indication. In some implementations, the indication may be a full, partial, or reduced size version of the drag area. In some implementations, the indication may be an icon suggesting that the drag-and-drop operation is still currently active. The indication may be selectable by a user of the mobile device 180, so that when the user may grab and drag the indication to a drop location. The drop location may be any area on the display of the mobile device. The user may select a drop location via a drop command, such as moving the indication to a location and tapping the indication once, performing a smudge on the destination, performing a long hold on the destination, etc. Thus, the drop location is determined by a drop command.

In some implementations, the drag-and-drop agent 120 may respond to voice commands for navigation and the drop command. For example, the user of the mobile device 180 may perform the drag command and then speak "search for this in my reservation app." The drag-and-drop agent 120 may analyze this statement and recognize that the statement requests a drop command in a search box of the reservation application. Thus, navigation and the drop command are understood to include voice commands.

The drag-and-drop agent 120 may perform recognition on the drop location to determine the type of entity represented by the drop location. For example, the entity may be a text input control, an image input control, a date/time input control, a list (e.g., drop-down, bullet), an application icon, or a contact entity. The action performed in response to the drop command may be dependent on the type of entity identified in the drag area and the entity recognized at the drop location, as will be explained in more detail herein.

Also where permissible, the drag-and-drop agent 120 may also perform a smart copy operation. A smart copy operation begins with selection of a smart copy control, which selects a drop location and allows the user to navigate to another screen and select content to copy (similar to a drag command) to the drop location. In some implementations, the drag-and-drop agent 120 may suggest recently seen entities after receiving the drop location. For example, the mobile device 180 may be running a content agent 140 that may be configured to capture the current screen, e.g. by copying or reading the contents of the device's frame buffer at intervals. The interval can be small, for example every half second or every second. In some implementations, the content agent 140 may be configured to capture the screen every time a touch event occurs, e.g., every time the user touches the screen to scroll, zoom, click a link etc. The content agent 140 may perform recognition on the screen capture image and may identify entities in the screen capture image. In some implementations, the content agent 140 may provide the entities and screen capture images to an indexing engine (not shown), that may generate or update an index that maps entities to the screen capture images they appear in. Using the index, the drag-and-drop agent 120 may determine which entities the user has seen recently and may select one or more of these entities as suggestions. In some implementations, the drag-and-drop agent 120 may use the mobile application type of the mobile application running when the user selected the smart copy control to select suggested entities. For example, if the user selected the smart copy control from a search box of a restaurant reservation mobile application, the drag-and-drop agent 120 may suggest recently viewed restaurant entities. In some implementations, the drag-and-drop agent 120 may offer a user interface that enables a user to scroll through the previously captured screen images to select an entity that appears in one of the images.

As illustrated in FIG. 1, components of the drag-and-drop agent 120 may be executed on mobile device 180. In some implementations, one or more components of the drag-and-drop agent 120 may be executed on server 190. For example, the mobile device 180 may send an area of the display selected by a drag operation to the server 190 for recognition and the server 190 may provide one or more entities identified in the selected area. Similarly, mobile device 180 may send an image as a query to the server 190 and the server 190 may provide results responsive to the query.

The mobile device 180 may also include a data graph 132. The data graph 132 may be a graph-based data store that stores data and rules that describe knowledge about the data in a form that provides for deductive reasoning. For example, in data graph 132, information may be stored about entities in the form of relationships to other entities and properties or attributes about the entity. The data graph 132 may be a subset of entities and edges from a large data graph, such as data graph 192 on server 190. The subset of entities and edges may be selected based on user-provided interests. Thus, the data graph 132 may store entities as nodes and relationships between entities as labeled edges. The data graph 132 may store some attributes for an entity as metadata. For example, an entity type may be stored as metadata or as a labeled edge that links the entity to a node that represents the entity type. As another example, text references to an entity may be stored as metadata or as separate nodes linked to the entity node by a labeled edge. The entities, attributes, and relationships in the data graph may be searchable, e.g., via an entity index (not shown). Thus, reference to the data graph 132 may be understood to include an entity index that facilitates finding an entity using a text query.

The mobile device 180 may also include a contacts data store 130. The contacts data store may be stored in memory on the mobile device or may be stored in a cloud-based user account accessible by the mobile device 180, or a combination of these. The contacts data store 130 may include contact entities, such as social media identifiers (e.g. user name), email addresses, phone numbers, etc. for people the user of the mobile device 180 knows. The contacts data store 130 may or may not be graph-based. The contacts data store 130 may be an address book, social media contacts, email contacts, mailing list, etc.

Figure 13:
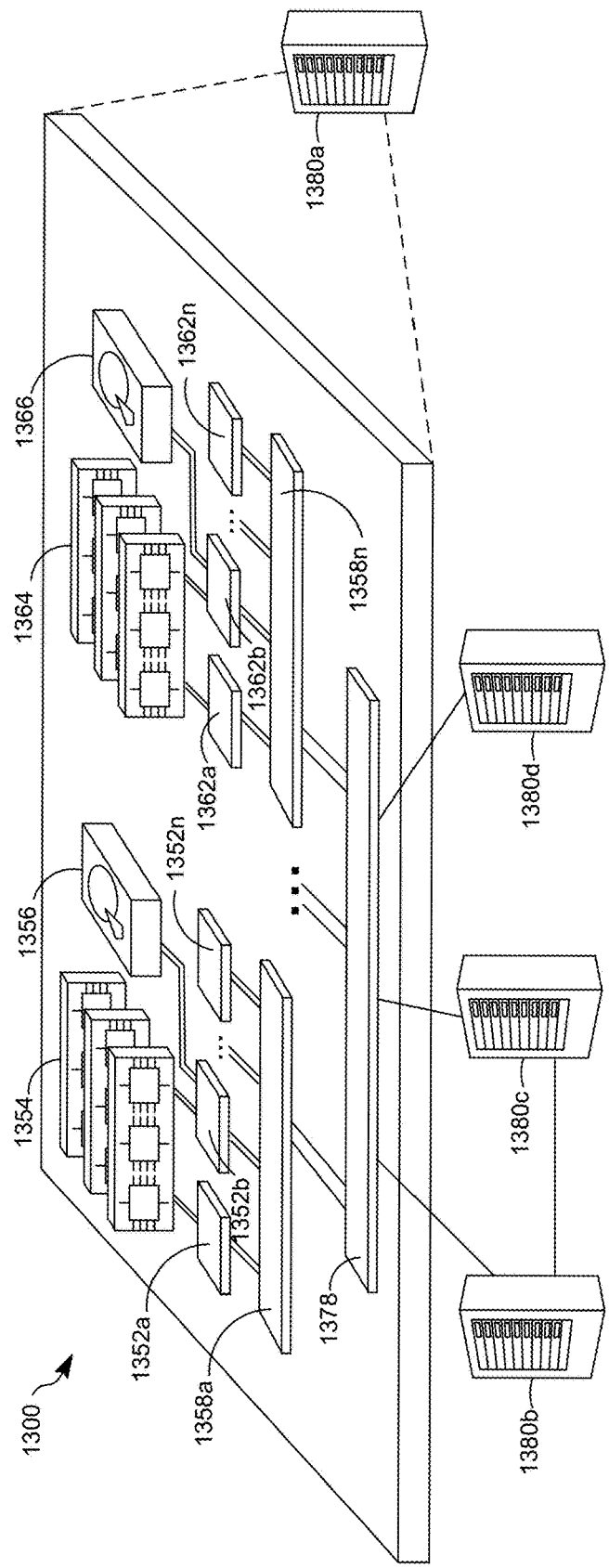
FIG. 13 shows an example of a distributed computer device that can be used to implement the described techniques.

The improved drag-and-drop system 100 may include a server 190, which may be a computing device or devices that take the form of a number of different devices, for example a standard server, a group of such servers, or a rack server system. For example, server 190 may be implemented in a distributed manner across multiple computing devices. In addition, server 190 may be implemented in a personal computer, for example a laptop computer. The server 190 may be an example of computer device 1200, as depicted in FIG. 12, or computer device 1300, as depicted in FIG. 13. Server 190 may include one or more processors formed in a substrate configured to execute one or more machine executable instructions or pieces of software, firmware, or a combination thereof. The server 190 can also include one or more computer memories. The memories, for example, a main memory, may be configured to store one or more pieces of data, either temporarily, permanently, semi-permanently, or a combination thereof. The memories may include any type of storage device that stores information in a format that can be read and/or executed by the one or more processors. The memories may include volatile memory, non-volatile memory, or a combination thereof, and store modules that, when executed by the one or more processors, perform certain operations. In some implementations, the modules may be stored in an external storage device and loaded into the memory of server 190.

The server 190 may also include a data graph 192. The data graph 192 may be a large graph-based data store that stores data and rules that describe knowledge about the data in a form that provides for deductive reasoning. For example, in data graph 192, information may be stored about entities in the form of relationships to other entities and properties or attributes about an entity. Entities may be related to each other by labeled edges that represent relationships. The labeled edges may be directed or undirected. For example, an entity representing the National Football League may be related to a Jaguar entity by a "has team" relationship. A data graph with a large number of entities and even a limited number of relationships may have billions of connections. In some implementations, the data graph may be stored in an external storage device accessible from server 190 and/or mobile device 180. In some implementations, the data graph 192 may be distributed across multiple storage devices and/or multiple computing devices, for example multiple servers. The entities, attributes, and relationships in the data graph may be searchable, e.g., via an entity index. For example, the entity index may include text by which an entity has been referred to. Thus, reference to the data graph 192 may be understood to include an entity index that facilitates finding an entity using a text query.

The server 190 may also include an entity recognition engine or other modules to search and traverse the data graph 192. For example, given an image the server 190 may match the image to an entity. In other words, the data graph 192 may store an image of an entity, for example as a node linked to the entity or as an attribute of the entity. As another example, the server 190 may also be able to identify an entity in the data graph 192 based on text, a phrase, or a nickname. In some implementations, the server 190 may also include a search engine. The search engine may search the data graph, an index of documents, or an image index based on a query.

The improved drag-and-drop system 100 may include data stores associated with a user account or profile. The data stores may reside on server 190, on the mobile device 180, or in another location specified by the user. The data stores may include a screen capture index generated by content agent 140, the contacts data store 130, data graph 132, etc. The data stores may be stored on any non-transitory memory.

The mobile device 180 may be in communication with the server 190 and with other mobile devices over network 160. Network 160 may be, for example, the Internet, or the network 160 can be a wired or wireless local area network (LAN), wide area network (WAN), etc., implemented using, for example, gateway devices, bridges, switches, and/or so forth. Network 160 may also represent a cellular communications network. Via the network 160, the server 190 may communicate with and transmit data to/from mobile device 180, and mobile device 180 may communicate with other mobile devices (not shown).

The improved drag-and-drop system 100 represents one example configuration and implementations may incorporate other configurations. For example, some implementations may combine one or more of the components of the drag-and-drop agent 120 and the content agent 140 into a single module or engine or one or more of the components of the drag-and-drop agent 120 and the content agent 140 may be performed by the server 190. As another example one or more of the data stores, such as contacts data store 130, data graph 132, data graph 192, drag-and-drop features 134, drag-and-drop features 194, or a screen capture index may be combined into a single data store or may distributed across multiple computing devices.

To the extent that the improved drag-and-drop system 100 collects and stores user-specific data or may make use of personal information, the users may be provided with an opportunity to control whether programs or features collect the user information (e.g., information about a user's social network, social actions or activities, past drag-and-drop operations, profession, a user's preferences, or a user's current location), or to control whether and/or how to receive content that may be more relevant to the user. In addition, certain data may be treated in one or more ways before it is stored or used, so that personally identifiable information is removed. For example, a user's identity may be treated so that no personally identifiable information can be determined for the user, or a user's geographic location may be generalized where location information is obtained (such as to a city, ZIP code, or state level), so that a particular location of a user cannot be determined. Thus, the user may have control over how information is collected about the user and used by an improved drag-and-drop system.

Figure 2B:
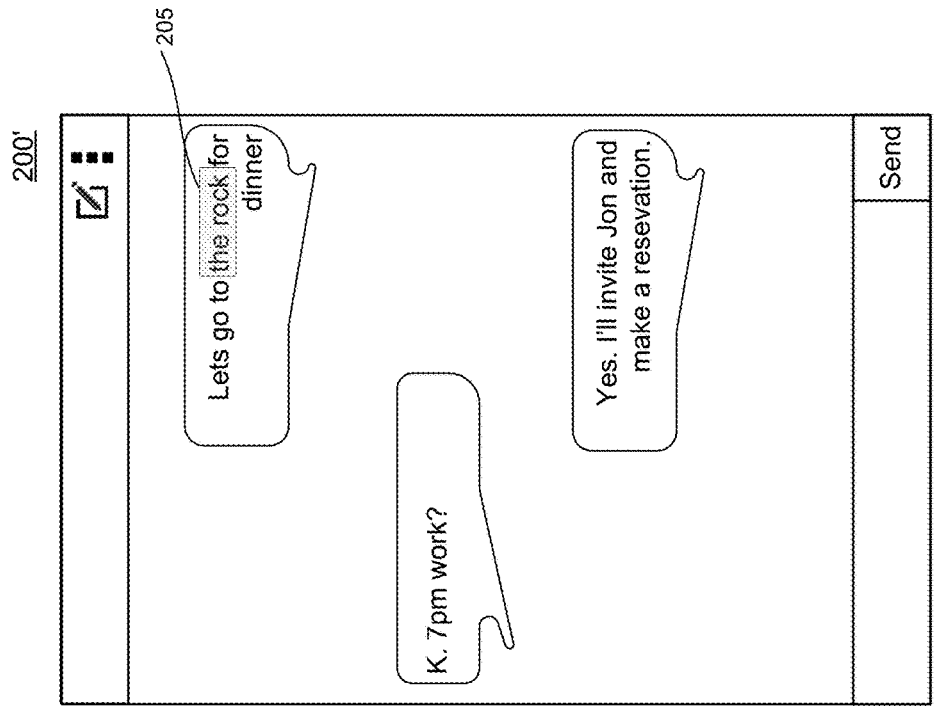
FIGS. 2A and 2B illustrate an example display used to select an entity for an improved drag-and-drop operation, in accordance with the disclosed subject matter.
Figure 2A:
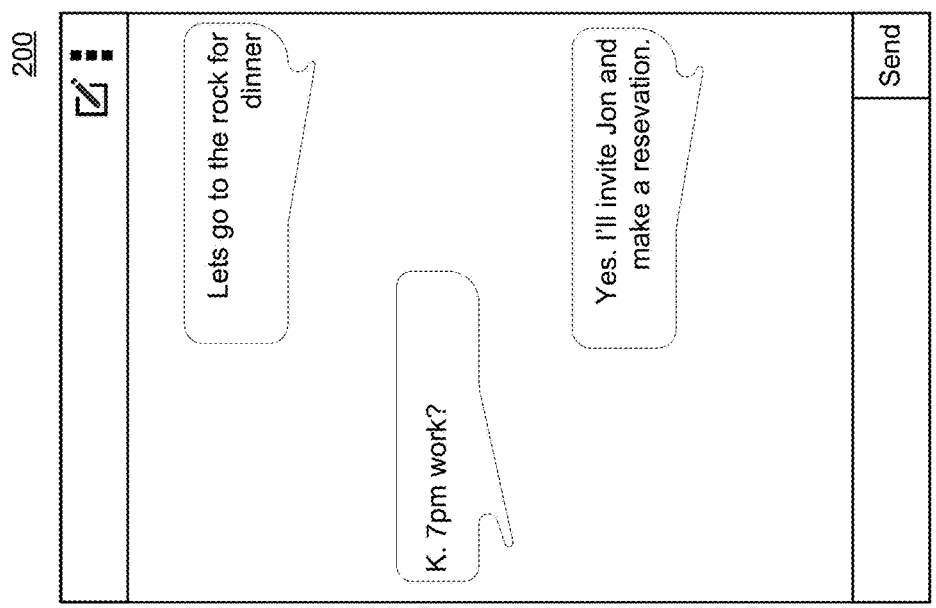

FIGS. 2A and 2B illustrate an example display used to select an entity for an improved drag-and-drop operation, in accordance with the disclosed subject matter. The display 200 of FIG. 2A is an example user interface used in a text messaging mobile application, although it is understood that the improved drag-and-drop operation functions in the same manner for any application executing on the mobile device. In the example of FIG. 2A, the user performs a drag command over the text "the rock" in the display 200. The drag command can be any combination of gestures recognized by the mobile device as a drag command. As examples only, the drag command may be a smudge, a two-finger tap, a long press, etc. As a result of the drag operation, the drag area 205 appears on the display, as illustrated in display 200'. The drag area 205 is the area of the display selected during or as a result of the drag command. As indicated above the mobile device may provide a selection box to assist the user in defining the drag area 205.

The system may perform recognition on the drag area 205, and may determine the phrase "the rock" corresponds to three entities in a graph-based data store. The first entity may be a restaurant that is known locally as "the Rock," the second may be an actor known as "the Rock," and the third may be Alcatraz Island, which is also nicknamed "the Rock." In some implementations, the system may disambiguate, or choose, between the three entities based on other context in the display 200. For example, the system may include a machine learning model that indicates when "the rock" appears in the same sentence as "dinner," the model indicates the entity referred to is the restaurant 85% of the time, or in other words the restaurant entity has a probability of 85%. If probabilities are close, the system may not be able to disambiguate the entity at the time of the drag command. In some implementations, the system may wait to perform disambiguation until the user selects a drop location, as described herein with regard to FIG. 3. In some implementations, the drag area may include several distinct and independent entities. For example, the drag area may include a friend's name, a movie, and a restaurant. Each entity is associated with the drag area, and the system may wait until a drop location is selected to determine which entity to use. For example, if the drop location is associated with a reservation application, the system may select the restaurant entity, but if the drop location is associated with a movie application, the system may select the movie entity. In some implementations, the system may provide a user interface that enables the user to choose the entity if the system cannot reliably select an entity based on the drop location context.

After the user issues the drag command, the mobile device may be in a drag-and-drop mode. In the drag-and-drop mode, the system may allow the user to navigate to other mobile applications, waiting for the user to perform a corresponding drop command. The user interface displayed when the user performs the drop command is the drop site. During navigation, the mobile device may provide an indication that the device is in drag-and-drop mode. For example, the mobile device may display a drag-and-drop operation icon at a fixed position on the display. As another example, the mobile device may display a portion of the drag area as an icon, as illustrated by drag area icon 305 of FIG. 3A. The drag area icon may include the entire drag area, or content corresponding to an entity identified in the drag area, or some other portion of the drag area. In some implementations, the system may resize the drag area icon 305 so that the icon approximates the size of a mobile application icon. In some implementations, the indication may be transparent or semi-transparent, so that the underlying display is partially visible. The indication may be selectable and capable of being moved around the display when the user clicks and drags the indication.

Figure 3B:
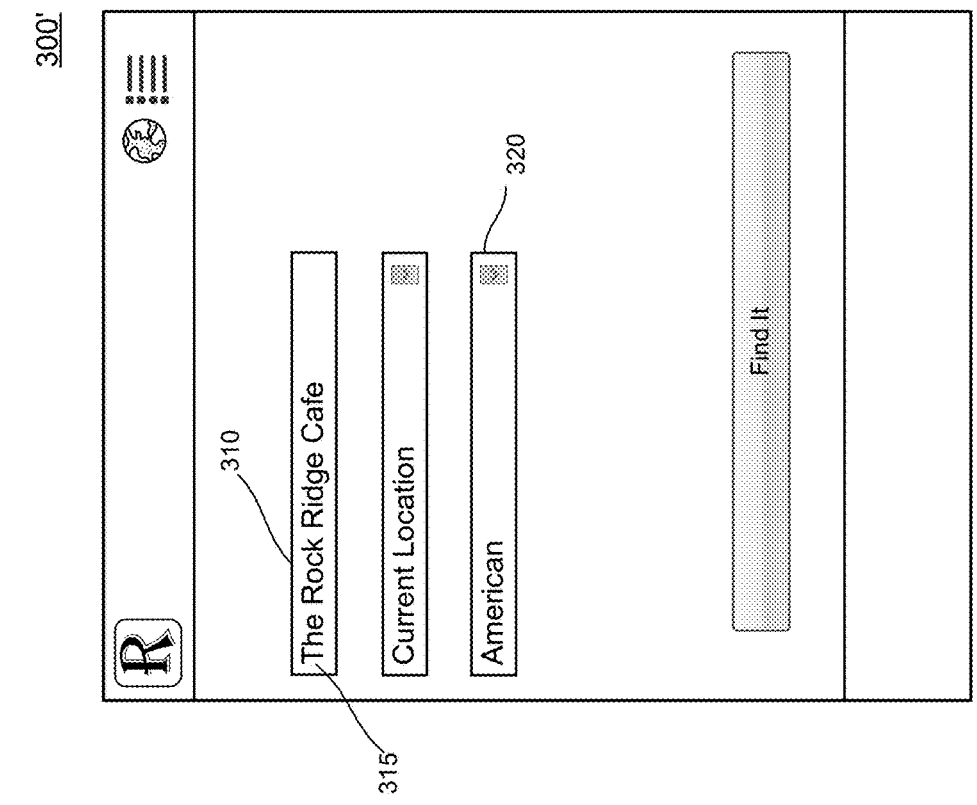
FIGS. 3A and 3B illustrate an example text input control drop location for an improved drag-and-drop operation, in accordance with the disclosed subject matter.
Figure 3A:
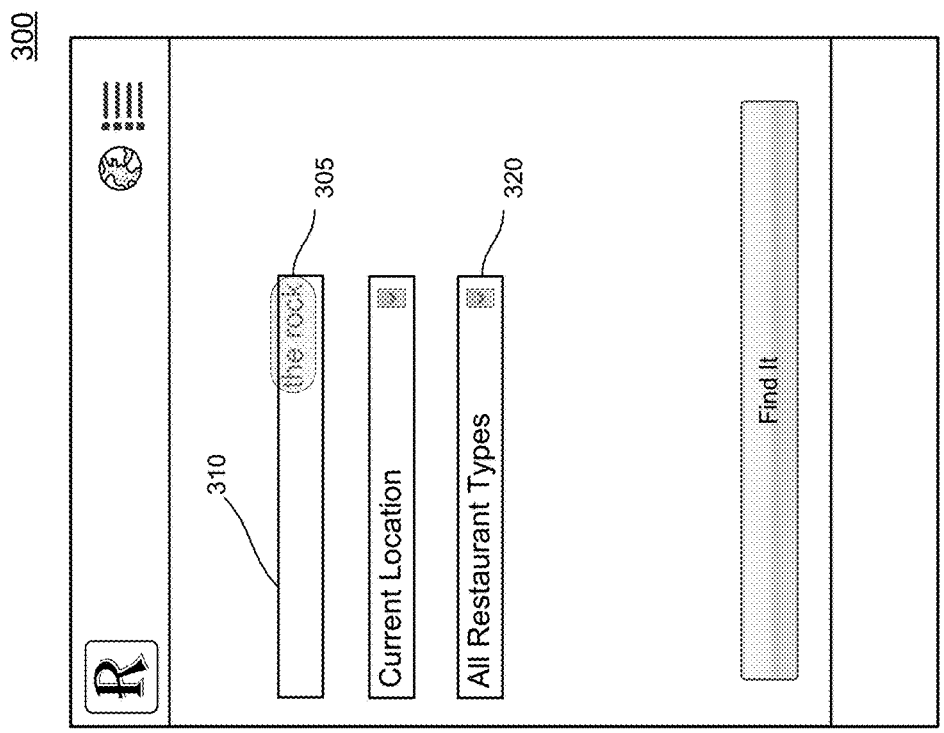

After arriving at the desired drop site via navigation, the user may issue a drop command. The drop command may be the same gestures as the drag command or the drop command may be different gestures. In some implementations, the drop command may include a drag of the indication to a location at the drop site and a release of the indication, the position of the indication marking the drop location at the drop site. FIG. 3A illustrates an example display 300 of a drop site with a drag area icon 305 displayed, which provides an indication that the mobile device awaits a drop command. The display 300 may represent a display generated by a restaurant reservation mobile application, although it is understood that a drop command works in a similar manner for other mobile applications. In the example of FIG. 3A, the user drags the icon 305 to a text input control 310. The user may release the icon 305 on the text input control 310. Doing so may mark the text input control 310 as the drop location.

As a result of the drop command, the system may analyze the drop location and determine that it is on a text input control. Accordingly, the system may determine a text equivalent to the entity represented by the drop area. The system may use the drop location to further disambiguate the entities identified in the drag area. In some implementations, entity disambiguation occurs only after the user identifies the drop location. In some implementations, disambiguation may be performed at the drop area interface and the drop site, if still needed. For example, the system may determine that the restaurant reservation application generated the user interface of display 300 and up-weight probabilities for restaurant related entities. As another example, the system may use context from the drop site, e.g., the display 300, to select an entity. For instance, the system may perform recognition and entity identification on the drop site and use the recognized entities to aid in disambiguation. In some implementations, if the system cannot automatically select between two entities, the system may provide a user interface that enables the user to choose between the two or more entities for the drag area. Once an entity is selected, the system pastes a text equivalent 315 for the entity into the text input control 310. As illustrated in FIG. 3B, the text equivalent 315 does not need to match the text in the drag area. The text equivalent 315 may be obtained from the graph-based data store. In the example of FIGS. 3A and 3B, the system determines that "the rock" refers to the restaurant, which has a formal name of "The Rock Ridge Cafe." The graph-based data store may indicate that this is the full name of the entity and the system may obtain this name from the data store. The system may choose the text equivalent based on context of the drop location. For example, if the full name of the restaurant entity is "The Rock" the system may provide this as the text equivalent to a drop location associated with restaurants (e.g., a restaurant reservation application). If the drop location is not restaurant specific, the system may provide additional text at the drop location. For example, if the drop location is a more generic search box, such as the search box for a Internet search engine application, the system may provide "The Rock restaurant" as the text equivalent. This additional information may be selected from the data graph.

In addition to providing the full name of the entity in the text input control 310, the system may also provide other metadata about the entity to assist the user. For example, the graph-based data store may include an attribute or relationship that indicates the Rock Ridge Cafe is an American-style restaurant. As another example, the system may have a multi-dimensional feature vector associated with each entity. Similar entities will be close to one another using some distance measure (e.g. cosine) between their respective feature vectors. For example, if the entity associated with the drag area is "France" and the drop-down text input control only has continents, the system may determine that the feature vector representation for the entity "France" is closest to one of the feature vectors for the entities in the drop-down (e.g. "Europe", "North America") and select the entity in the drop-down closest representation. Using this information, the system may select "American" from the drop-down list 320 for restaurant types. Thus, as a result of the drop command, the system may generate display 300', which completes information for the user in text input control 310 as well as drop-down list 320.

Figure 4B:
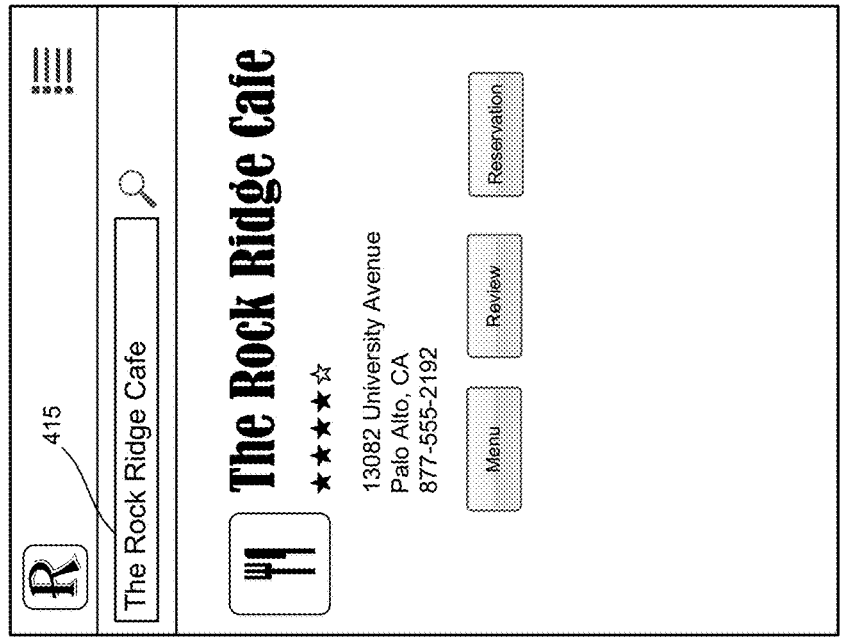
FIGS. 4A and 4B illustrate an example mobile application icon drop location for an improved drag-and-drop operation, in accordance with the disclosed subject matter.
Figure 4A:
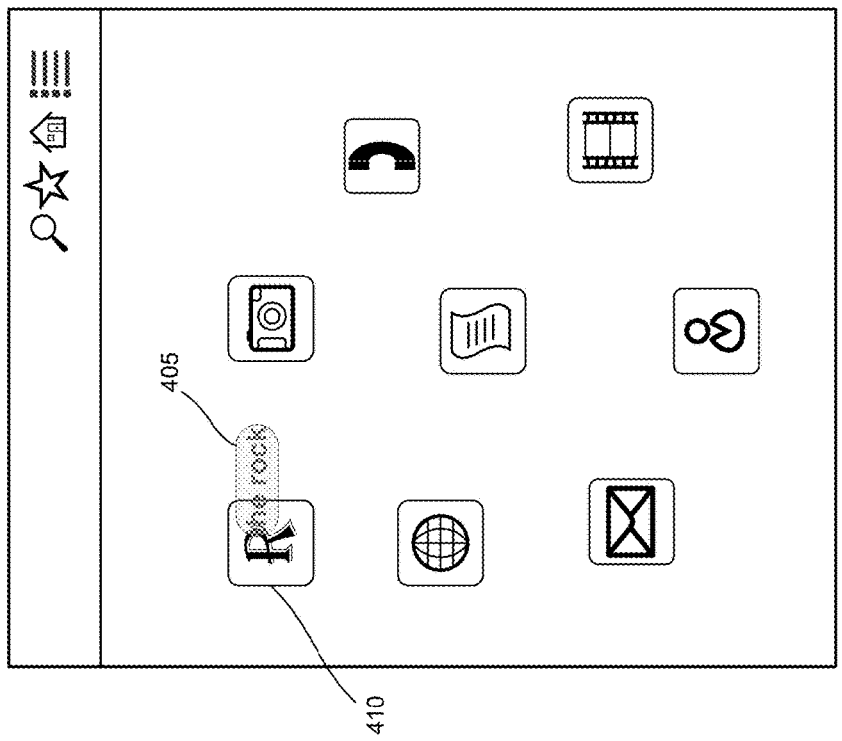

FIG. 4A illustrates another example of a drop location for the drag area of FIG. 2B. In the example of FIG. 4A, the drop site is a user interface that includes icons for various mobile applications installed on the mobile device. The display 400 includes the user interface and the icon 405 that indicates the mobile device is in a drag-and-drop mode. In the example of FIG. 4A, the user drops the icon 405 on the mobile app icon 410 for the restaurant reservation application. Responsive to the drop command the system determines which application is associated with the icon at the drop location and opens that application. In addition to opening the application, the system may use drag-and-drop features, such as features 134 or 194 of FIG. 1, to determine a default action. For example, based on the entity type (e.g., a restaurant) for the entity in the drag area, the system may determine that the mobile application should open the application to an interface for that particular restaurant, as illustrated in display 450 of FIG. 4B.

The action performed may depend on the entity in the drag area and the type of mobile application associated with the icon at the drop location. For example, if the drop location is an icon for a communications application, the action may be to open a new message in the communications application and share the entity. Sharing the entity may depend on the content of the drag area. For example, if the drag area is text-based, sharing the entity may include providing the text equivalent for the entity and other data, such as a link to a website or address for the entity. When the drag area is image-based, sharing the entity may include inserting a link to an image for the entity. For example, the system may search for a public URL for the image and provide a link to the public URL. In some implementations, the public URL may be an attribute of the corresponding entity node in the data graph. As another example the system may, with user permission, transmit the image to a server and provide a URL to the location of the image at the server. When the drop location is an icon for an application that has a search interface, the action may be to initiate a search for the entity in the drag location, as illustrated in FIG. 4B. Examples of applications with search interfaces are map applications, browser applications, reservation and review applications, news applications, etc. In some implementations, if the entity type is not compatible with the type of mobile application, the system may terminate the drag-and-drop operation. For example, if a car entity is dropped on a restaurant reservation mobile application icon, the system may determine that the mobile application is not compatible with this entity type and either terminate the drag-and-drop or ask the user if they want to drop the entity on a different location. Whether a mobile application type is compatible with an entity type may be determined, for example, using drag-and-drop features or some other data store.

The drop location can also be a contact entity. FIG. 5 illustrates a contact entity as a drop location, in accordance with disclosed implementations. In the example of FIG. 5, the user interface is a picture preview interface in a camera application. The display 500 includes the user interface generated by the camera application and icon 505, which indicates the mobile device is in drag-and-drop mode. In the example of FIG. 5, the icon 505 represents the drag area selected in FIG. 2B. As illustrated in the display 500, the camera has a business card in view. The user may drop the icon 505 on the telephone number 510 printed on the business card. In response, the system may perform recognition on the drop location and determine that it represents a contact entity. For example, the system may recognize the format and context as consistent with a telephone number. When the icon 505 is dropped on a contact entity, the default action after a drop command is to share the entity represented by the icon 505. FIG. 6 illustrates an example action performed as a result of the drop command of FIG. 5. For example, the system may open a text messaging application to a new message, as illustrated in display 600. The new message may be directed to the phone number 510. In other words, the system automatically addresses the new message to the contact entity identified at the drop location. The system may also supply a default text message 610 that shares the entity represented by the display area. Thus, the display 600 includes the default text message 610 listing the full name of the restaurant and the website of the restaurant. This information may be obtained, for example, from the graph-based data store. If the icon 505 represents more than one entity and the destination does not help disambiguate between the entities, the system may provide a user interface that allows the user to select one of the entities after the drop command.

Figure 8:
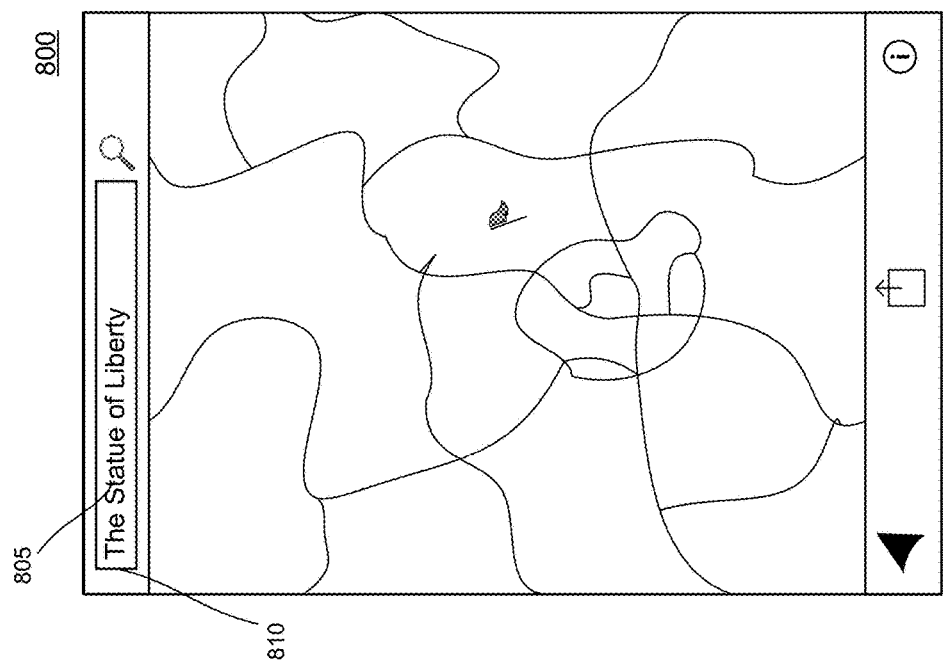
FIG. 8 illustrates an example action performed in response to a drop command corresponding to the drag area of FIG. 7, in accordance with disclosed implementations.
Figure 7:
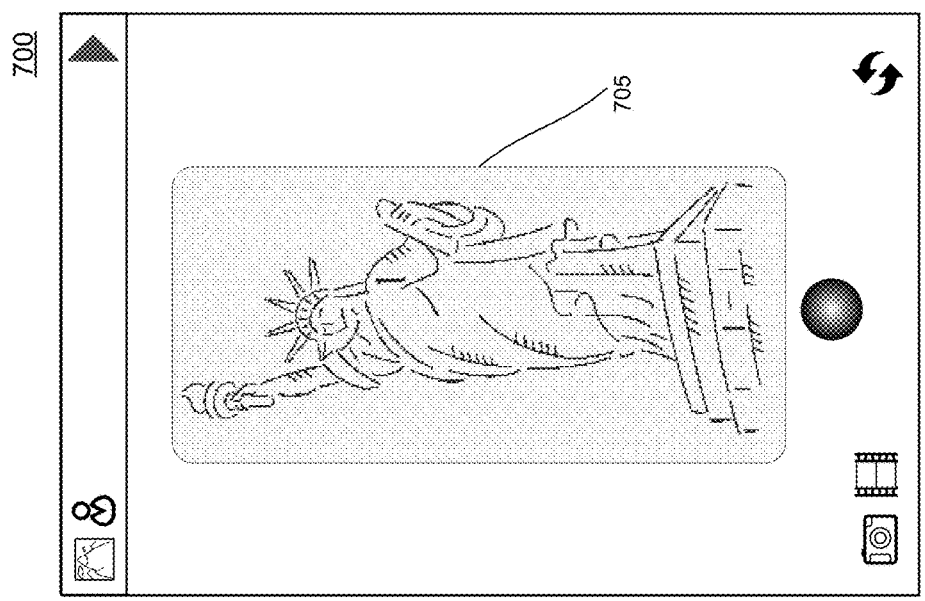
FIG. 7 illustrates an example display used to select an image-based drag area in response to a drag command, in accordance with disclosed implementations.

It is understood that a drag command may also be performed in the picture preview user interface. For example, the user may position the camera over a newspaper or magazine review of a restaurant and select the name or address of the restaurant in the preview area via a drag command. The system may interpret this as the restaurant entity, for example in a graph based data store, and the user may drop the entity at a drop location as described above. Thus, the improved drag-and-drop operation functions for text in an image, text rendered by a mobile application, as well as images without text. FIG. 7 illustrates an example display 700 used to select an image-based drag area, in accordance with disclosed implementations. The display 700 of FIG. 7 is also from a preview interface in a camera application, but could be any image in any mobile application. In situations where such capture is permissible, the user may perform a drag command that selects the image as drag area 705. The system may, in response to the drag command, perform recognition on the drag area and determine that it corresponds to the entity for the Statue of Liberty. This may be accomplished using landmark recognition, for example. The user may navigate to a drop site and perform a drop command. The drop site may be a search box 810 in a map application, as illustrated in FIG. 8. The search box 810 is an example of a text input control. In FIG. 8, the user interface in display 800 is generated by a map application and the drop operation results in the insertion of the text equivalent 805 of the picture from drag area 705 into the search box 810 of the map application. Of course, the user may also perform a drop command on the icon for the map application and the system may perform the search for "Statue of Liberty" automatically. Similarly, the user may perform a drop command on a contact entity and the system may share a link to the picture represented by the drag area 705, as described herein.

It is understood that FIGS. 7 and 8 may also represent a smart copy. For example, the user may view display 800 of FIG. 8 and perform a smart copy command in the search box 810. The smart copy command can be any gestures recognized as a smart copy or can be a control provided in the keyboard that appears when a user selects the search box 810. In some implementations, the system may offer a list of recently viewed entities for copying into the search box 810. The entities offered may be entities of a type compatible with a map application (e.g., places, landmarks). Selection of one of the suggested entities constitutes a paste operation and the insertion of a text equivalent for the entity into search box 810. The user could also navigate to another mobile application and perform a paste command. The paste command may be similar to the drag command in that it enables the user to select an area of the display. The system may perform recognition on the selected area, as with a drag command, and may paste a text equivalent for an entity identified in the selected area into the text input control identified using the smart copy control. Thus, a smart copy is similar to a drag-and-drop but with the drop occurring first.

Figure 9A:
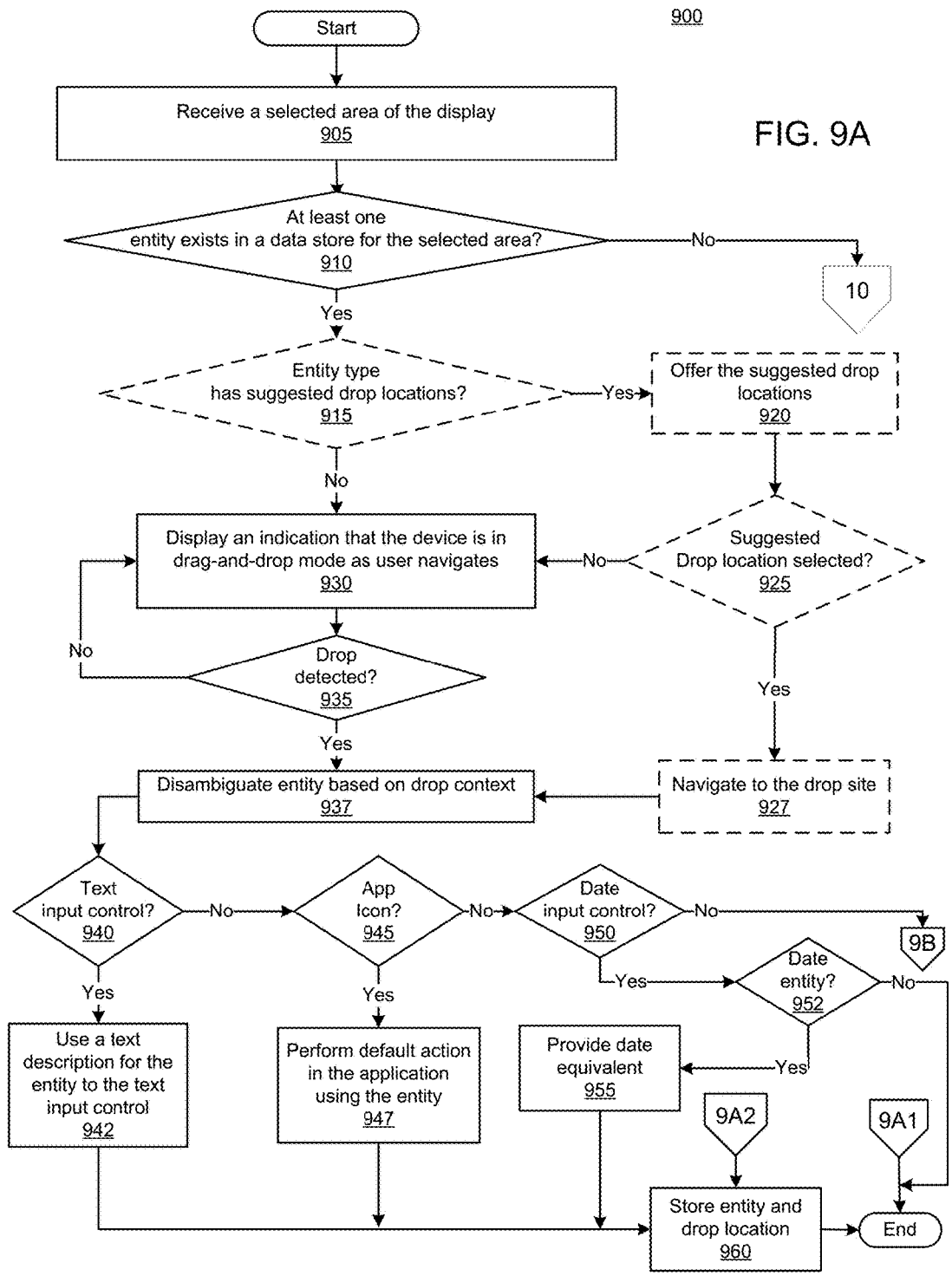
FIGS. 9A and 9B are flow diagrams illustrating an example entity-based drag-and-drop operation, in accordance with disclosed implementations.
Figure 9B:
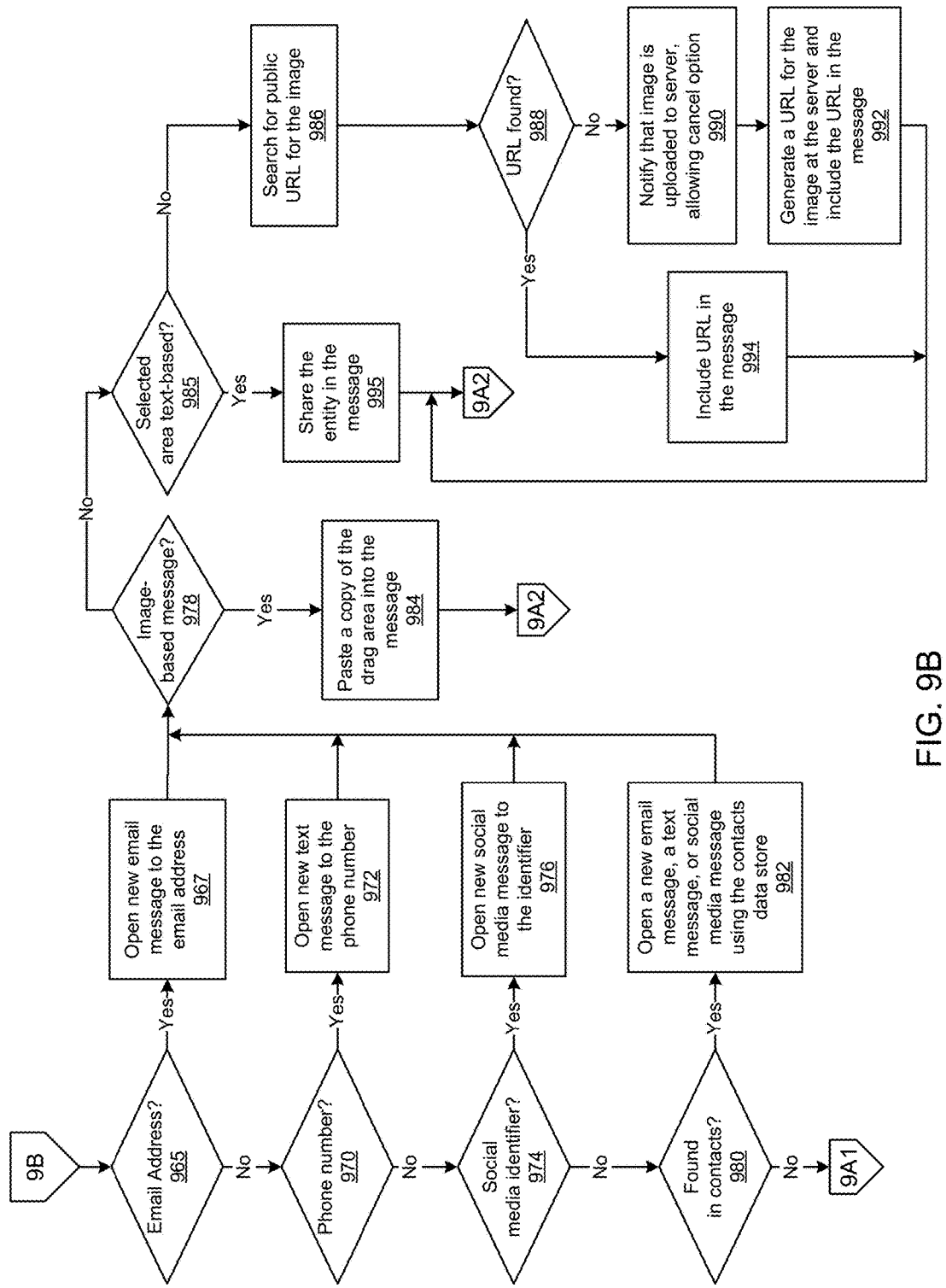

FIGS. 9A and 9B are flow diagrams illustrating an example entity-based drag-and-drop operation 900, in accordance with disclosed implementations. The drag-and-drop operation 900 may be performed by an improved drag-and-drop system, such as system 100 of FIG. 1, and may improve the transfer of information between mobile applications and minimize gestures made by the user. The drag-and-drop operation 900 may begin by receiving a selected area of the display (905). For example, the selected area may be coordinates identified by the user after performing a drag command. The system may use the coordinates to obtain a copy of data in the frame buffer at the coordinates, when such a copy is consistent with any device or application restrictions. The selected area is also referred to as the drag area. The system may perform recognition on the selected area to determine if the selected area includes an entity from an entity data store (910). The recognition may include character recognition, landmark recognition, logo recognition, facial recognition, etc., that recognizes entities in a data store. The entity data store may be a graph-based data store or a contacts data store. The entity data stores may be local to the device generating content on the display or may be remote, for example server-based. In some implementations, the recognition may result in more than one entity identified in the selected area.

In some implementations, the system may perform step 910 prior to step 905. For example, the system may perform recognition on the entire screen, mapping the recognized contents to entities, prior to receipt of a drag command. In such an implementation, after a user performs a drag command the drag-and-drop agent 120 may focus on or select an entity in or closest to the location of the drag command. Thus, in such an implementation, the system may determine the entities first and may determine the drag area based on a location of the drag command and a previously recognized entity closest to the location.

If the selected area does not include an entity from an entity data store (910, No), the system may perform a search-based drag-and-drop, as described below with regard to FIG. 10. If an entity does exist in a data store for the selected area (910, Yes), the system may determine whether the entity type of the entity is associated with any suggested drop sites or locations (915). For example, the system may include a drag-and-drop features data store that includes historical information about the drop sites and locations for various entities and entity types identified in previous drag areas. This information may be for the user of the mobile device or may be supplemented with generalized data from other users. The data may be used by a machine learning algorithm or prediction engine that uses the data to predict which drop sites are most often selected when an entity of a given entity type is identified in the drag area. The prediction engine may only suggest drop sites when a probability reaches a threshold.

When the system determines there are suggested drop sites for the entity type (915, Yes), the system may offer the suggested drop sites in a user interface (920). If the user selects one of the suggestions (925, Yes), the system may automatically navigate to the drop site (927). Navigating to the drop site may include opening the mobile application associated with the drop site to a user interface represented by the drop site, which may or may not be the default interface that appears when the mobile application is started. The drop site suggestion may also identify a particular input element, for example a text box or drop-down selection box, that serves as the drop location for the entity. Accordingly, selection of a suggested drop site eliminates the user input conventionally used to navigate to the same interface. This improves the response time and user experience on the mobile device.

When there are no suggested drop sites (915, No) or when the user does not select one (925, No), the system may allow the user to navigate to a drop site (930). The user may navigate using gestures or via a voice command. For example, after the drag command the user may tell the system to "search for this on a map." The system may interpret this as a drop command that initiates a search of a text description for the entity identified in the drag area in a map application. Such a voice command may thus be considered navigating to the map application and selecting a drop location (e.g., a search box in the search user interface). When navigation takes place using gestures, the system may display an indication that the mobile device is in a drag-and-drop mode while the user navigates. An example of this indication is illustrated as icon 305 of FIG. 3A. The indication may be a general icon that provides an indication of the mode or may include all or part of the drag area. In some implementations, the indication may be selectable so that the user can move the indication around the display and, ultimately moved to the drop location. In some implementations, the indication is not selectable and is used merely as an indication that the system awaits a drop command that corresponds to the drag command.

The drop command may specify a drop location within the drop site. In some implementations, a drop command includes dragging the indication to a location and releasing the indication. In some implementations, the drop command may include gestures made at the drop location, similar to identifying the drag area. In some implementations, the drop location may be an input field. In some implementations, the drop location may be a selectable icon, e.g., a mobile application icon. In some implementations, the drop location may be text or an image. In such an implementation, the system may analyze the underlying display, e.g. by performing recognition on a copy of the display as described above with regard to the drag area, and determining if the drop location includes an entity.

When a drop command is detected (935, Yes), the system may use the context of the drop site to disambiguate the entity associated with the drag area, if needed (937). For example, the system may use the type of mobile application that generated the drop site, other text or images displayed with the drop location, an entity associated with the drop location, etc., as context for disambiguation. In some implementations, the system may perform some disambiguation at the time of the drag command as well. In some implementations, the drag area may include two or more distinct entities. For example, the drag area may include a reference to a movie and a reference to a restaurant. Each of these entities is associated with the drag area, and the system may select one based on the context of the drop location. For example, if the drop location is associated with a reservation application, the system may select the restaurant entity, but if the drop location is associated with a movie application, the system may select the movie entity. In some implementations, the system may provide a user interface that enables the user to choose the entity if the system cannot reliably select an entity based on the drop location context.

The system may perform an action in response to the drop command, depending on the drop location and the entity associated with the drag area. In some implementations, determining the type or kind of drop location may be based on image-based recognition of the underlying area, for example using a classifier. In some implementations, determining the type of the drop location may include inspecting the view hierarchy and element types of the destination application. In some implementations, the drop location type may be determined based on a combination of image-based recognition, the view hierarchy, and the element types. For example, if the drop location is a text input control, such as a text box or list selector (940, Yes), the system may use a text description of the entity to fill in the text box or make a selection from the list (942). In making a selection for a list, the system may use a list entry that most closely corresponds to the text description or other attributes of the entity. A text description of the entity is obtained from the entity data store not from the drag area. Thus, the text description can be different from any text in the drag area. Furthermore, when the drag area contains no text the system may still obtain a text description of the entity depicted in the drag area from the entity data store. This example demonstrates the difference between a conventional copy-paste operation that copies selected text, and implementations of the entity-based drag-and-drop operation.

If the drop location is an icon for a mobile application (945, Yes), the system may perform a default action in the mobile application using the entity (947). The default action may be based on the type of mobile application. For example, if the entity in the drag area is a contact entity and the icon is for a contacts application, the action may be to add a new entry for the entity. As another example, the default action for communication applications, such as text applications, email applications, and social media applications, may be to open the application to a 'compose' user interface. The system may share the entity via the compose user interface. How the entity is shared may depend on the communication type of the mobile application. For example, if the icon is for a picture sharing mobile application the system may find a picture of the entity to share. For example, in some implementations, the entity data store may include a picture of the entity. When the drop area is a picture the system may, with user permission and when consistent with any terms of service restrictions or intellectual property rights, copy the selected area into the compose user interface. As another example, the system may upload the selected area into the to a user account at a server, generate a URL for the picture, and provide the URL to the compose interface. As another example, the system may provide a text equivalent for the entity and, optionally, metadata or attributes for the entity from the entity data store to the compose interface.

When the icon is for an application with a search interface, the default action may be to open the mobile application to the search interface and search for a text equivalent of the entity. In some implementations, the system may store a table having a default action for various mobile applications. In some implementations, when the mobile application is installed it may update the table with the default action. In some implementations, if an entry does not exist in the table or if the system determines the entity type is inconsistent with the mobile application type, the system may terminate the drag-and-drop operation without performing an action. If the system is able to perform a default action, the system completed a successful drag-and-drop operation.

If the drop location is a date input control (950, Yes), the system may determine if the entity is a date entity (952), e.g., if the entity represents a date. An example, the drag area may include the text "Next Wednesday" and the system may determine, based on the current date, a calendar date for the drag area. The calendar date is a date entity. If the entity is a date entity (952, Yes), the system may provide the date entity to the date input control (955). The system has, accordingly, completed a successful drag-and-drop operation. If the entity is not a date entity, in some implementations the system may terminate the drag-and-drop operation without performing an action.

The system may also store information on a successful drag-and-drop operation by storing the entity and the drop location (960). The drop location may include the drop site identified via a mobile application identifier and a user interface for the mobile application. In some implementations, the drop location may also specify a particular input field or control within the user interface. In some implementations, the drop location may specify an entity type associated with the drop location, for example identifying an email address, phone number, or a contact entity in general. This information may be used to train a machine learning algorithm or prediction engine to more successfully suggest proposed drop sites in the future. Subsequently, the drag-and-drop operation 900 ends.

When the drop location is not a text-based input or an icon (950, No), the system may determine if the drop location includes a contact entity, as illustrated in FIG. 9B. The system may recognize contact entities by performing recognition on the area surrounding the drop location and determining whether any recognized text or images matches a pattern or regular expression, matches an entry in one or more user data stores, such as a contacts data store, or matches a social media identifier. For example, the system may recognize a drop location including an email address based on the format of the text in the drop location. When the drop location is an email address (965, Yes), the system may open an email mobile application to a user interface for composing a new email message (967). The system may automatically use the email address from the drop location to fill in the recipient field of the new message. In some implementations, the mobile device may include a table of mobile applications that identify themselves as email applications and may select a default application using this list. When the system determines the drop location includes a phone number (970, Yes), the system may open an instant message or text mobile application to a user interface for typing a text message and fill in the recipient field with the phone number from the drop location (972).

The system may also recognize a drop location as a social media identifier. For example, the social media identifier may match an identifier in a contacts data store, or may match a name that occurs commonly in a social media application but not outside the application (e.g., using a term frequency-inverse document frequency statistic. As another example, the system may have hard-coded rules for identifying social media identifiers based on the social media application or may perform named entity detection when the drop site is a social media application to select contact names. When the system determines the drop location includes a social media identifier (e.g. user name) (974, Yes), the system may open a mobile application corresponding to the social media identifier to a user interface for composing a message directed to the social media identifier (976).

When the text in the drop location does not match a contact entity pattern, the system may query one or more contacts data stores using the text or image of the drop location. The contacts data stores may be local to the mobile device or may be user-accounts stored at a server. If a contact is identified in one of the contacts data stores as matching the information in the drop location (980, Yes), the system may select contact information for the matching contact from the contact data store and use the information to open a corresponding mobile application (982). For example, if the email address is selected from the contact data store, the system may open an email mobile application as described above. Of course the system may select a phone number or social media identifier or other contact information from the contacts data store as similarly described above.

Some messaging applications are image-based rather than text-based and are configured to send images as the message, especially social media applications. Accordingly, the system may determine if the message is image-based (978). If the message is image-based (978, Yes), the system may paste a copy of the drag area into the message for the user (984), where such an operation is not otherwise prohibited by law or contract. In some implementations, the system may paste an image from the graph-based data store that is associated with the entity instead of pasting the drag area. For example, the graph-based data store may include an image associated with the entity and the system may paste the image in the image-based message. In some implementations, the system may allow the user to choose whether to share the display area or the image from the graph-based data store. The message may then be ready for transmission by the user. Returning to FIG. 9A, the system may record the entity and the drop location, as explained with regard to step 960. The drag-and-drop operation 900 thus ends.

If the message is not image-based (978, No), the system may determine if the selected area, or the drag area, is text-based (985). The drag area is text-based when a majority of the drag area includes recognized characters or numbers. If the drag area is text-based (985, Yes), the system may share the entity in the message (995). Sharing the entity may include pasting a text description into the message, for example from the entity data store. The text description may include text description of attributes of the entity, e.g., an entity type. Thus, for example, the text description may include an equivalent for the entity from the graph-based data store as well as text describing an entity type or some other attribute of the entity to help the message recipient determine whether the text is for a movie, a restaurant, etc. In other words, the system may include information from the graph-based data store to help the message recipient disambiguate the entity mention. As an example, the system may share "Jaguar car" rather than just "Jaguar". The text description may also include as additional information about the entity. For example, when the entity data store includes a website associated with the entity, the system may include the website. As another example, when the entity data store includes an image for the entity the system may attach the image. Other examples of additional information that can be added include an address for the entity, a phone number, etc. In some implementations, the additional information may depend on the type of the entity. For example, a business may have a website added while a landmark may have address information added. In some implementations, the system may provide a user interface that enables the user to select what information from the entity data store is included in the message. Such an interface may offer data items or attributes associated with the entity in the entity data store for selection, which further reduces the input provided by the user to share information. The user may further edit the message and send the message. Sharing the entity may also include sharing a picture associated with the entity from the graph-based data store. In some implementations, the system may provide a user interface that asks the user if the user wants to share a description or the image. For example, the user interface may ask "Do you want to share this image <image> or this description <description>?" Returning to FIG. 9A, the system may record the entity and the drop location, as explained with regard to step 960, and the drag-and-drop operation 900 concludes.

When the drag area is not text-based (985, No), the system may provide a Uniform Resource Locator (URL) for the image to share in the message. For example, the system may search for a public image that corresponds to the image in the drag area (986) using conventional techniques. An example of image search techniques are described in International Patent Publication No WO 2012/075315 entitled "Identifying Matching Canonical Documents in Response to a Visual Query," the disclosure of which is incorporated herein its entirety. If a matching document is found (988, Yes), the system may include a URL to that document in the message (994). The system may also include other metadata about the entity, for example from the entity data store, as described with regard to step 995. The user may further edit the message and send the message. Returning to FIG. 9A, the system may record the entity and the drop location, as explained with regard to step 960, and the drag-and-drop operation 900 concludes.

When a public URL is not found (988, No), the system may notify the user that the drag area will be uploaded to a server where not otherwise prohibited and allowing the user to cancel the upload if desired (990). After uploading the image, the system may generate a URL or other location identifier for the image at the server and include the URL in the message (992). The system may also include other metadata about the entity, for example from the entity data store, as described with regard to step 995. The user may further edit the message and send the message. Returning to FIG. 9A, the system may record the entity and the drop location, as explained herein with regard to step 960, and the drag-and-drop operation concludes.

Figure 10:
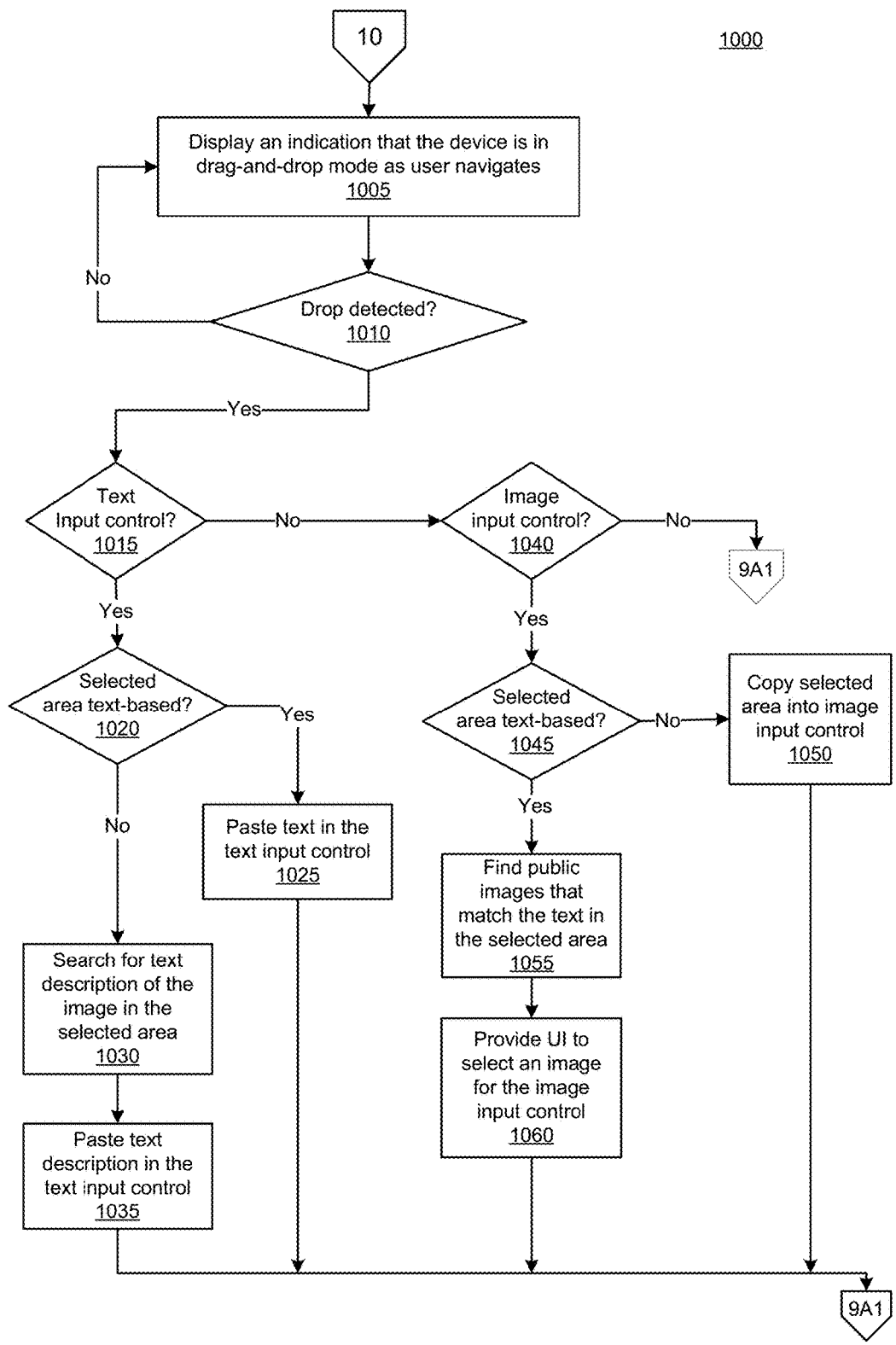
FIG. 10 is a flow diagram illustrating an example search-based drag-and-drop operation, in accordance with disclosed implementations.

FIG. 10 is a flow diagram illustrating an example search-based improved drag-and-drop operation 1000, in accordance with disclosed implementations. The drag-and-drop operation 1000 may be performed by an improved drag-and-drop system, such as system 100 of FIG. 1, and used to improve the transfer of information between mobile applications and minimize gestures from the user via a flexible framework. The drag-and-drop operation 1000 assumes that the user has selected a drag area, as described with regard to step 905, and that the drag area does not correspond to an entity in an entity data store (910, No). Similar to step 930 and 935 described above, the system may display an indication that the mobile device is in a drag-and-drop mode while the user navigates to a drop site. The indication may be an icon or a representation of a portion of the drag area. The system may wait for the user to perform a drop command (1010). The drop command may specify a drop location within the drop site as described with regard to step 935 of FIG. 9A. In drag-and-drop operation 1000, the drop location may be a text input control or an image input control. When a drop is detected (1010, Yes), the system may determine if the drop location is a text input control (1015). If the drop location is a text input control (1015, Yes), the system may determine whether the selected area is text-based (1020). The selected area is text-based when the majority of the area includes recognized characters, including numbers. If the selected area is text-based (1020, Yes), the system may paste the text recognized from the drag area into the text input control (1025) and operation 1000 ends.

When the drag area is not text-based (1020, No), the system may search for a text description of the image from the drag area (1030). For example, the system, when permissible, may send the drag area as a query to an image search engine, which may return search results including a text description for the image. The system may drop the text description into the text input control (1035) and operation 1000 ends.

When the drop location is an image input control (1040, Yes), the system may determine whether the selected area, or drag area, is text-based (1045) When it is not, the system may provide the selected area as an image for the image input control (1050), where not prohibited by contract or law, and process 1000 ends. If the drag area is text-based (1045, Yes), the system may search for a public image that matches the text from the drag area (1055) using a conventional image search techniques. The system may provide a user interface to select an image from among the search results and, where permissible, provide the image to the image input control (1060). Process 1000 then ends.

If the drop location is not a text input control or an image input control (1040, No), the system may terminate the drag-and-drop operation 1000 without performing an action in response to the drop command, as the system may be unable to determine what the user intended.

With regard to FIGS. 9A, 9B, and 10, it is understood that the order of the steps shown is exemplary and may be performed in a different order. For example, in some implementations, the system may determine whether the drag area corresponds to an entity at the time of the drop command.

Figure 11:
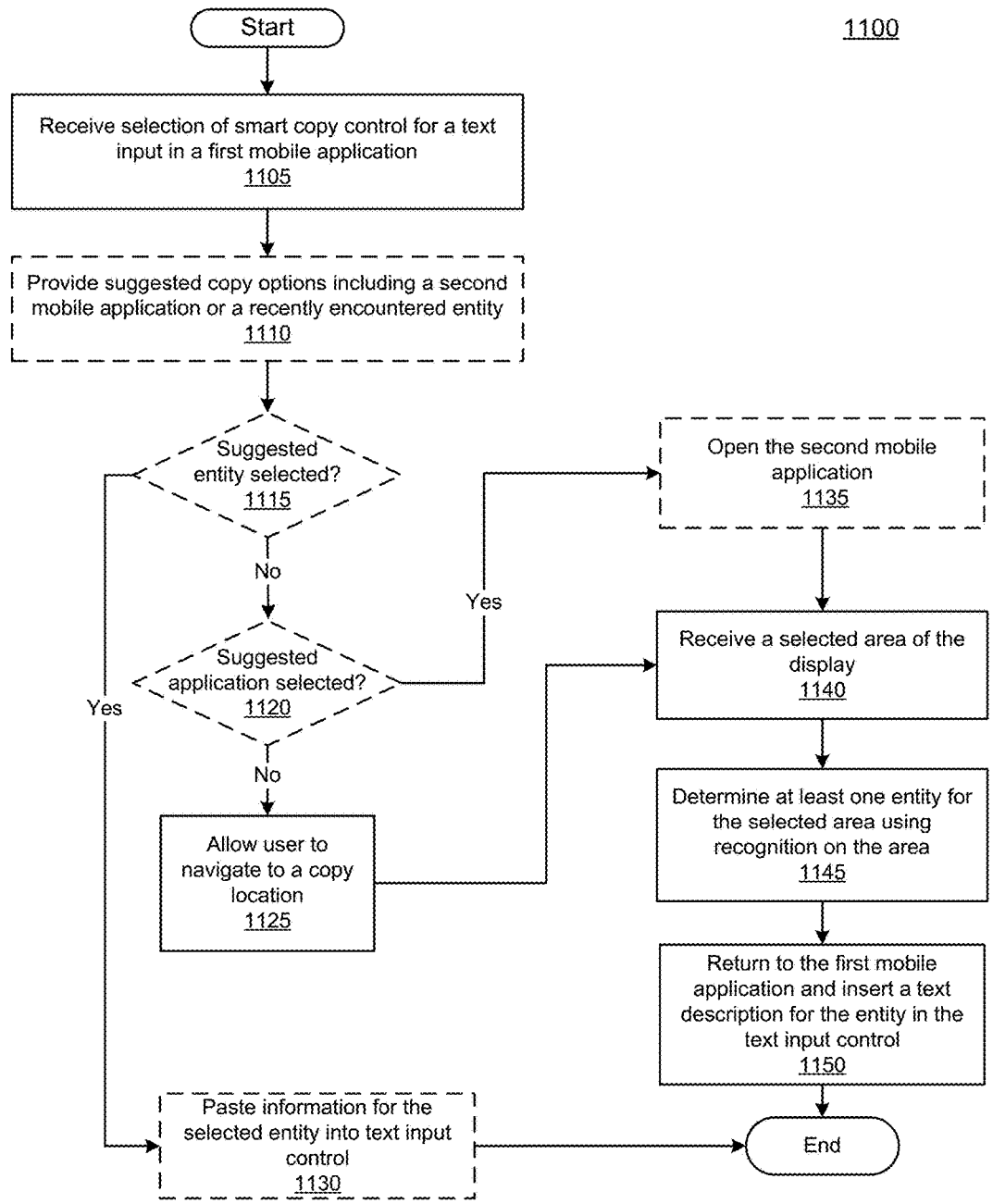
FIG. 11 is a flow diagram illustrating an entity-based smart copy operation, in accordance with disclosed implementations.

FIG. 11 is a flow diagram illustrating an entity-based smart copy operation 1100, in accordance with disclosed implementations. The smart copy operation 1100 may be performed by an improved drag-and-drop system, such as system 100 of FIG. 1. A smart copy operation is similar to a drag-and-drop operation, except that the drop location is identified first and then the user navigates to a display to select the drag area, which may be referred to as the copy area for purposes of a smart copy operation. The smart copy operation may also improve the transfer of information between mobile applications and minimize gestures from the user. The smart copy operation may begin when a user selects a smart copy control for a text input control in a first mobile application (1105). The smart copy control may be selectable or activated when the user clicks in a text input control. In some implementations, the smart copy control may be a button added to a touch-screen keyboard that is activated when the user selects on the text input control. In some implementations, the smart copy control may be a gesture or combination of gestures. Selection of the smart copy control marks the text input control as a drop or paste location.

In some implementations, the system may generate a user interface that offers suggested copy options for the user (1110). As suggested copy option may be a second mobile application where the user can select text to copy into the text input control. Another suggested copy option may be a recently encountered entity. Another suggested copy option may be a user interface that displays recently captured screen images and allows the user to select an entity in one of the images. The suggested second applications may be based, for example, on past drag-and-drop or smart copy operations. Such operations may be stored in a data store, such as features 134 or 194 of FIG. 1. Such past operations may provide an indication of which second applications are used as source text when the first application receives the text. For example, if the user is currently in a search box in a map application and selects the smart copy control, the system may use the data store to suggest a contacts mobile application as the second application, as the user (or other users) commonly copy addresses from the contacts mobile application to the map application.

Similarly, the system may also suggest recently encountered entities for copying into the text input control. In such implementations, the mobile device may include a content agent that tracks entities a user has encountered and may use this information to personalize the user experience. As part of personalization, the system may offer recently encountered entities as copy options. For example, if the user had been looking at local restaurants in a reservation mobile application and is now in a map application, the system may offer some of the recently seen restaurants as copy options. If the user had been texting a contact, the contact may be a suggested copy option. The system may intelligently select from any recently encountered entities, suggesting only those with an entity type consistent with the text input control. For example, if the text input control is a search box in a reservation mobile application, the system may select restaurant entities or hotel entities. If the text input control is in a map application, the system may suggest place entities, including landmarks as well as restaurants and hotels. If the text input control is in a movie database application, the system may suggest entities related to movies, etc.

If the user selects a suggested entity (1115, Yes), the system may paste information about the entity into the text input control (1130). The information may be a text description of the entity or may be other information or attributes for the entity. For example, the system may use information from an entity data store which includes attributes or facts about the entity. The system may choose an attribute or fact appropriate for the context of the text input control. For example if the text input control is a search box in a map application, the system may select the address for the entity. Similarly, if the text input control expects a phone number, the system may provide a phone number for the entity. The smart copy process 1100 then ends, without the user having to navigate at all to move previously encountered information into the text input control.

If the user does not select a suggested entity, the system may save a state of the first mobile application, for example by making a copy of environment variables associated with the first application. The copy of the environment variables can enable the system to automatically navigate back to the first mobile application to paste text into the text input control after receiving the copy area. If the user selects a suggested second application (1120, Yes), the system may automatically open the second mobile application, so the user does not have to navigate to the second mobile application (1135). In some implementations, the suggested second mobile application may include a particular user interface within the second mobile application and the system may open the second mobile application to the user interface. If no suggestion is selected (1120, No) or of the system does not offer any suggestions, the system may allow the user to navigate to a copy location (1125). The copy location may be any user interface in any mobile application on the mobile device. Once at the copy location, the system may receive a selected area of the display (1140). The selected area may also be referred to as a copy area. Receiving the copy area is similar to selection of the drag area as described above with regard to step 905 of FIG. 9A. The system may perform recognition on the copy area. Thus, the smart copy operation 1100 works on rendered text as well as text not rendered as text. In some implementations, the system may return any text recognized in the copy area to the input box in the first mobile application, navigating back to the first mobile application so the user can see the text pasted into the text input control. In some implementations, the system may determine if the selected area corresponds to an entity in an entity data store (1145). If the copy area does include an entity, the system may return to the first mobile application and paste a description for the entity in the text input control (1150). In some implementations, the system may paste an attribute or fact about the entity into the text input control, where appropriate, as discussed above with regard to step 1130. The smart copy operation 1100 then ends.

FIG. 12 shows an example of a generic computer device 1200, which may be operated as system 100, and/or client 170 of FIG. 1, which may be used with the techniques described here. Computing device 1200 is intended to represent various example forms of computing devices, such as laptops, desktops, workstations, personal digital assistants, cellular telephones, smartphones, tablets, servers, and other computing devices, including wearable devices. The components shown here, their connections and relationships, and their functions, are meant to be examples only, and are not meant to limit implementations of the inventions described and/or claimed in this document.

Computing device 1200 includes a processor 1202, memory 1204, a storage device 1206, and expansion ports 1210 connected via an interface 1208. In some implementations, computing device 1200 may include transceiver 1246, communication interface 1244, and a GPS (Global Positioning System) receiver module 1248, among other components, connected via interface 1208. Device 1200 may communicate wirelessly through communication interface 1244, which may include digital signal processing circuitry where necessary. Each of the components 1202, 1204, 1206, 1208, 1210, 1240, 1244, 1246, and 1248 may be mounted on a common motherboard or in other manners as appropriate.

The processor 1202 can process instructions for execution within the computing device 1200, including instructions stored in the memory 1204 or on the storage device 1206 to display graphical information for a GUI on an external input/output device, such as display 1216. Display 1216 may be a monitor or a flat touchscreen display. In some implementations, multiple processors and/or multiple buses may be used, as appropriate, along with multiple memories and types of memory. Also, multiple computing devices 1200 may be connected, with each device providing portions of the necessary operations (e.g., as a server bank, a group of blade servers, or a multi-processor system).

The memory 1204 stores information within the computing device 1200. In one implementation, the memory 1204 is a volatile memory unit or units. In another implementation, the memory 1204 is a non-volatile memory unit or units. The memory 1204 may also be another form of computer-readable medium, such as a magnetic or optical disk. In some implementations, the memory 1204 may include expansion memory provided through an expansion interface.

The storage device 1206 is capable of providing mass storage for the computing device 1200. In one implementation, the storage device 1206 may be or include a computer-readable medium, such as a floppy disk device, a hard disk device, an optical disk device, or a tape device, a flash memory or other similar solid state memory device, or an array of devices, including devices in a storage area network or other configurations. A computer program product can be tangibly embodied in such a computer-readable medium. The computer program product may also include instructions that, when executed, perform one or more methods, such as those described above. The computer- or machine-readable medium is a storage device such as the memory 1204, the storage device 1206, or memory on processor 1202.

The interface 1208 may be a high speed controller that manages bandwidth-intensive operations for the computing device 1200 or a low speed controller that manages lower bandwidth-intensive operations, or a combination of such controllers. An external interface 1240 may be provided so as to enable near area communication of device 1200 with other devices. In some implementations, controller 1208 may be coupled to storage device 1206 and expansion port 1214. The expansion port, which may include various communication ports (e.g., USB, Bluetooth, Ethernet, wireless Ethernet) may be coupled to one or more input/output devices, such as a keyboard, a pointing device, a scanner, or a networking device such as a switch or router, e.g., through a network adapter.

The computing device 1200 may be implemented in a number of different forms, as shown in the figure. For example, it may be implemented as a standard server 1230, or multiple times in a group of such servers. It may also be implemented as part of a rack server system. In addition, it may be implemented in a computing device, such as a laptop computer 1232, personal computer 1234, or tablet/smart phone 1236. An entire system may be made up of multiple computing devices 1200 communicating with each other. Other configurations are possible.

FIG. 13 shows an example of a generic computer device 1300, which may be system 100 of FIG. 1, which may be used with the techniques described here. Computing device 1300 is intended to represent various example forms of large-scale data processing devices, such as servers, blade servers, datacenters, mainframes, and other large-scale computing devices. Computing device 1300 may be a distributed system having multiple processors, possibly including network attached storage nodes, that are interconnected by one or more communication networks. The components shown here, their connections and relationships, and their functions, are meant to be examples only, and are not meant to limit implementations of the inventions described and/or claimed in this document.

Distributed computing system 1300 may include any number of computing devices 1380. Computing devices 1380 may include a server or rack servers, mainframes, etc. communicating over a local or wide-area network, dedicated optical links, modems, bridges, routers, switches, wired or wireless networks, etc.

In some implementations, each computing device may include multiple racks. For example, computing device 1380*a* includes multiple racks 1358*a*-1358*n*. Each rack may include one or more processors, such as processors 1352*a*-1352*n* and 1362*a*-1362*n*. The processors may include data processors, network attached storage devices, and other computer controlled devices. In some implementations, one processor may operate as a master processor and control the scheduling and data distribution tasks. Processors may be interconnected through one or more rack switches 1358, and one or more racks may be connected through switch 1378. Switch 1378 may handle communications between multiple connected computing devices 1300.

Each rack may include memory, such as memory 1354 and memory 1364, and storage, such as 1356 and 1366. Storage 1356 and 1366 may provide mass storage and may include volatile or non-volatile storage, such as network-attached disks, floppy disks, hard disks, optical disks, tapes, flash memory or other similar solid state memory devices, or an array of devices, including devices in a storage area network or other configurations. Storage 1356 or 1366 may be shared between multiple processors, multiple racks, or multiple computing devices and may include a computer-readable medium storing instructions executable by one or more of the processors. Memory 1354 and 1364 may include, e.g., volatile memory unit or units, a non-volatile memory unit or units, and/or other forms of computer-readable media, such as a magnetic or optical disks, flash memory, cache, Random Access Memory (RAM), Read Only Memory (ROM), and combinations thereof. Memory, such as memory 1354 may also be shared between processors 1352*a*-1352*n*. Data structures, such as an index, may be stored, for example, across storage 1356 and memory 1354. Computing device 1300 may include other components not shown, such as controllers, buses, input/output devices, communications modules, etc.

An entire system, such as system 100, may be made up of multiple computing devices 1300 communicating with each other. For example, device 1380*a* may communicate with devices 1380*b*, 1380*c*, and 1380*d*, and these may collectively be known as server 190. As another example, system 100 of FIG. 1 may include one or more computing devices 1300. Some of the computing devices may be located geographically close to each other, and others may be located geographically distant. The layout of system 1300 is an example only and the system may take on other layouts or configurations.

According to certain aspects of the disclosure, a method includes identifying, on a touchscreen display, a drag area in a user interface of a first mobile application in response to a drag command from a user of a mobile device and identifying an entity from a graph-based data store based on recognition performed on content in the drag area. The method may also include receiving a drop location associated with a second mobile application, the second mobile application differing from the first mobile application, determining an action to be performed in the second mobile application based on the drop location, and performing the action in the second mobile application using the entity.

These and other aspects can include one or more of the following features. For example, the action can include sharing the entity via a new message when the second mobile application includes a communications application and/or the action can include initiating a search using a description of the entity when the second mobile application has a search user interface. As another example, the method may also include identifying the drop in response to a voice command that identifies a user interface of the second mobile application. As another example, the drop location may include an icon that launches the second mobile application and the action can include launching a particular user interface in the second mobile application based on a type of the entity. As another example, the method can include determining that the drop location includes a text input control, wherein performing the action includes pasting a text description for the entity from the graph in the text input control. As another example, the method can include displaying an indication of the drag area from the first mobile application on the display while the user navigates to the drop location in the second mobile application. As another example, the entity may be a first entity and the method may further include storing the first entity and the second mobile application in a data store, identifying at least a second entity from the graph in a second drag area in response to a second drag command from the user, determining that an entity type for the second entity matches an entity type for the first entity, and based on the determination, providing the second mobile application as a suggested drop location. As another example, the method may include sending the drag area to a server, the server identifying the at least one entity. As another example, the drag area can include an image and the entity is recognized in the image.

According to certain aspects of the disclosure, a mobile device includes a display, at least one processor, and memory storing instructions that, when executed by the at least one processor, cause the mobile device to perform operations. The operations may include identifying a drag area in a user interface of a first mobile application in response to a drag command from a user of the mobile device, determining, based on recognition performed on content in the drag area, that the drag area includes at least one entity from a graph-based data store storing a graph having entities as nodes of the graph, receiving a drop location, determining the drop location is associated with a contact entity, and automatically initiating a communication to the contact entity, the communication including information about the entity from the graph.

These and other aspects can include one or more of the following features. For example, the drop location may be identified in a voice command that identifies the contact entity. As another example, the memory may further store instructions that, when executed by the at least one processor, cause the mobile device to determine that the drop location occurs on an email address, wherein the communication is an email message. In such an implementation, the mobile device may also include a camera that generates a picture preview user interface and the email address may appear in the picture preview user interface. As another example, the memory may also store instructions that, when executed by the at least one processor, cause the mobile device to determine that a drop operation occurs on a social media identifier, wherein the communication includes sharing the entity with the social media identifier via a social media application. As another example, the mobile device may include a camera that generates a picture preview user interface and the drag area appears in the picture preview user interface. In another example, the memory further stores instructions that, when executed by the at least one processor, cause the mobile device to display an indication of the drag area on the display while the user navigates to the drop location. As another example, the drag area may be image-based and the memory may also store instructions that, when executed by the at least one processor, cause the mobile device to search for a public URL that matches the drag area and provide the public URL in the communication or upload the drag area to a server, receive a URL from the server, the URL being a location of the drag area on the server, and provide the URL in the communication. As another example, determining that the drag area includes the at least one entity can include sending the drag area to a server, the server storing the graph-based data store and receiving information about the entity from the server.

According to certain aspects of the disclosure, a method includes receiving a selection of a smart copy control for a text input control on a mobile device, the text input control being in a first mobile application, receiving a selected area of a display generated by a second mobile application, and identifying at least one entity of a graph-based data store in the selected area based on recognition performed on content of the selected area. The method may also include automatically navigating back to the text input control in the first mobile application and pasting a text description of the entity from the graph in the text input control.

These and other aspects can include one or more of the following features. For example, the method may also include providing at least a second entity as a suggestion, an entity type of the second entity being compatible with the first mobile application and/or providing a third mobile application as a suggestion, the third mobile application selected based on prior smart copy operations. As another example, the entity may be identified from an image in the selected area.

According to another aspect of the disclosure, a method includes identifying, on a touchscreen display of a mobile computing device, a drag area in a user interface of a first mobile application in response to a drag command from a user of a mobile device, wherein the drag area is not text-based, receiving a drop location associated with a second mobile application, the second mobile application differing from the first mobile application, determining that the drop location is a text input control, performing an image search to determine a text description for the drag area and pasting the text description into the text input control.

Various implementations can include implementation in one or more computer programs that are executable and/or interpretable on a programmable system including at least one programmable processor, which may be special or general purpose, coupled to receive data and instructions from, and to transmit data and instructions to, a storage system, at least one input device, and at least one output device.

These computer programs (also known as programs, software, software applications or code) include machine instructions for a programmable processor, and can be implemented in a high-level procedural and/or object-oriented programming language, and/or in assembly/machine language. As used herein, the terms "machine-readable medium" "computer-readable medium" refers to any non-transitory computer program product, apparatus and/or device (e.g., magnetic discs, optical disks, memory (including Read Access Memory), Programmable Logic Devices (PLDs)) used to provide machine instructions and/or data to a programmable processor.

The systems and techniques described here can be implemented in a computing system that includes a back end component (e.g., as a data server), or that includes a middleware component (e.g., an application server), or that includes a front end component (e.g., a client computer having a graphical user interface or a Web browser through which a user can interact with an implementation of the systems and techniques described here), or any combination of such back end, middleware, or front end components. The components of the system can be interconnected by any form or medium of digital data communication (e.g., a communication network). Examples of communication networks include a local area network ("LAN"), a wide area network ("WAN"), and the Internet.

The computing system can include clients and servers. A client and server are generally remote from each other and typically interact through a communication network. The relationship of client and server arises by virtue of computer programs running on the respective computers and having a client-server relationship to each other.

A number of implementations have been described. Nevertheless, various modifications may be made without departing from the spirit and scope of the invention. In addition, the logic flows depicted in the figures do not require the particular order shown, or sequential order, to achieve desirable results. In addition, other steps may be provided, or steps may be eliminated, from the described flows, and other components may be added to, or removed from, the described systems. Accordingly, other implementations are within the scope of the following claims.

What is claimed is:

1. A mobile device comprising:
   a display;
   at least one processor; and
   memory storing instructions that, when executed by the at least one processor, cause the mobile device to perform operations including:
   in response to a drag command from a user of the mobile device, identifying, within the display, a drag area in a user interface of a first mobile application,
   identifying an entity in the drag area based on recognition performed on content in the drag area,
   receiving a drop location associated with a second mobile application, the second mobile application differing from the first mobile application, and
   performing an action in the second mobile application using the entity, the action being determined based on the drop location.

2. The mobile device of claim 1, wherein the entity exists in a data store of entities.

3. The mobile device of claim 1, wherein the operations further include:
   determining that the drop location is a date input control; and
   determining that the entity is a date entity,
   wherein performing the action includes determining a calendar date for the entity and providing the date to the date input control.

4. The mobile device of claim 1, further comprising identifying the drop in response to a voice command that identifies a user interface of the second mobile application.

5. The mobile device of claim 1, wherein the drop location includes an icon that launches the second mobile application.

6. The mobile device of claim 5, wherein the action includes launching a particular user interface in the second mobile application based on a type of the entity.

7. The mobile device of claim 1, wherein the operations further include:
   determining that the drop location includes a text input control,
   wherein performing the action includes pasting a text description for the entity from an entity data store in the text input control.

8. The mobile device of claim 1, further comprising:
   identifying a plurality of entities in the drag area; and
   selecting the entity from the plurality of entities based on disambiguation that uses context of the drop location.

9. The mobile device of claim 1, wherein the entity is a first entity and the operations further include:
   storing the first entity and the second mobile application in a data store;
   identifying at least a second entity in a second drag area in response to a second drag command from the user;
   determining that an entity type for the second entity matches an entity type for the first entity; and
   based on the determination, providing the second mobile application as a suggested drop location.

10. The mobile device of claim 1, wherein determining the action based on the drop location includes:
    sending the drag area and the drop location to a server, the server identifying the at least one entity and determining the action; and
    receiving the entity and the action from the server.

11. The mobile device of claim 1, wherein the drag area includes an image and the entity is recognized in the image.

12. A method comprising:
    identifying, on a touchscreen display of a mobile computing device, a drag area in a user interface of a first mobile application in response to a drag command from a user of a mobile device, wherein the drag area is not text-based;
    receiving a drop location associated with a second mobile application, the second mobile application differing from the first mobile application;
    determining that the drop location is a text input control;
    performing an image search to determine a text description for the drag area; and
    pasting the text description into the text input control.

13. The method of claim 12, wherein the drop location is identified in a voice command that identifies the text input control.

14. The method of claim 12, wherein the drag area is text-based when a majority of the area includes recognized characters, including numbers.

15. The method of claim 12, wherein the drag area appears in a picture preview user interface generated by a camera.

16. The method of claim 12, wherein performing the image search includes:
    searching for a public URL that matches the drag area, wherein the public URL is the text description.

17. A method comprising:
    identifying, on a touchscreen display of a mobile computing device, a drag area in a user interface of a first mobile application in response to a drag command from a user of a mobile device;
    receiving a drop location associated with a second mobile application, the second mobile application differing from the first mobile application;
    determining whether the drop location is an image input control and whether the drag area is text-based; and
    responsive to the determining that the drop location is an image input control and the drag area is text-based:
    performing an image search to determine an image responsive to text recognized in the drag area, and
    pasting the image into the image input control.

18. The method of claim 17, further comprising:
    determining whether the drop location is a text input control and whether the drag area is text-based; and
    responsive to the determining that the drop location is a text input control and that the drag area is not text-based:

performing an image search of the drag area to determine a text description for the drag area, and pasting the text description into the text input control.

19. The method of claim 17, wherein the drag area is text-based when a majority of the drag area includes recognized characters, including numbers.

20. The method of claim 17, further comprising:

determining whether the drag area includes an entity, the entity being included an entity data store;

when the drag area does not include an entity, performing the image search and pasting; and when the drag area does include an entity:

determining an action to be performed in the second mobile application based on the drop location, and performing the action in the second mobile application using the entity.

* * * * *